(12) United States Patent
Verfuerth et al.

(10) Patent No.: US 8,604,701 B2
(45) Date of Patent: Dec. 10, 2013

(54) SYSTEMS AND METHOD FOR LIGHTING AISLES

(76) Inventors: Neal R. Verfuerth, Manitowoc, WI (US); Tony Freeman, DePere, WI (US); Jason Rasner, DePere, WI (US)

(*) Notice: Subject to any disclaimer, the term of this patent is extended or adjusted under 35 U.S.C. 154(b) by 205 days.

(21) Appl. No.: 13/296,058

(22) Filed: Nov. 14, 2011

(65) Prior Publication Data

US 2012/0274222 A1   Nov. 1, 2012

Related U.S. Application Data

(60) Provisional application No. 61/466,411, filed on Mar. 22, 2011.

(51) Int. Cl.
*H05B 37/02* (2006.01)
*H05B 39/04* (2006.01)
*H05B 41/36* (2006.01)

(52) U.S. Cl.
USPC ........... 315/149; 315/158; 315/159; 315/291; 315/307

(58) Field of Classification Search
None
See application file for complete search history.

(56) References Cited

U.S. PATENT DOCUMENTS

| | | | |
|---|---|---|---|
| D538,462 S | 3/2007 | Verfuerth et al. | |
| D557,817 S | 12/2007 | Verfuerth | |
| D560,469 S | 1/2008 | Bartol et al. | |
| 7,401,942 B1 | 7/2008 | Verfuerth et al. | |
| D595,894 S | 7/2009 | Verfuerth et al. | |
| 7,563,006 B1 | 7/2009 | Verfuerth et al. | |
| 7,575,338 B1 | 8/2009 | Verfuerth | |
| D606,697 S | 12/2009 | Verfuerth et al. | |
| D606,698 S | 12/2009 | Verfuerth et al. | |
| 7,628,506 B2 | 12/2009 | Verfuerth et al. | |
| 7,638,743 B2 | 12/2009 | Bartol et al. | |
| D617,028 S | 6/2010 | Verfuerth et al. | |
| D617,029 S | 6/2010 | Verfuerth et al. | |
| 7,746,003 B2 | 6/2010 | Verfuerth et al. | |
| 7,762,861 B2 | 7/2010 | Verfuerth et al. | |
| D621,410 S | 8/2010 | Verfuerth et al. | |
| D621,411 S | 8/2010 | Verfuerth et al. | |
| 7,780,310 B2 | 8/2010 | Verfuerth et al. | |
| 7,784,966 B2 | 8/2010 | Verfuerth et al. | |
| D623,340 S | 9/2010 | Verfuerth et al. | |
| D632,006 S | 2/2011 | Verfuerth et al. | |
| D650,225 S | 12/2011 | Bartol et al. | |
| 8,070,312 B2 | 12/2011 | Verfuerth et al. | |
| 8,136,958 B2 | 3/2012 | Verfuerth et al. | |
| RE43,456 E | 6/2012 | Verfuerth et al. | |
| 2005/0259416 A1* | 11/2005 | Gauna et al. ................. | 362/227 |
| 2009/0000217 A1 | 1/2009 | Verfuerth et al. | |
| 2009/0009989 A1 | 1/2009 | Verfuerth et al. | |
| 2009/0147507 A1 | 6/2009 | Verfuerth et al. | |
| 2009/0189535 A1 | 7/2009 | Verfuerth et al. | |
| 2009/0243517 A1 | 10/2009 | Verfuerth et al. | |
| 2009/0248217 A1 | 10/2009 | Verfuerth et al. | |
| 2009/0299811 A1 | 12/2009 | Verfuerth et al. | |
| 2009/0303722 A1 | 12/2009 | Verfuerth et al. | |
| 2009/0315485 A1 | 12/2009 | Verfuerth et al. | |
| 2010/0061088 A1 | 3/2010 | Bartol et al. | |
| 2010/0141153 A1* | 6/2010 | Recker et al. ................. | 315/149 |
| 2010/0246168 A1 | 9/2010 | Verfuerth et al. | |

(Continued)

*Primary Examiner* — Anh Tran
(74) *Attorney, Agent, or Firm* — Foley & Lardner LLP

(57) ABSTRACT

A lighting fixture for aisle lighting in a building includes processing electronics. The processing electronics are configured to cause the lighting fixture to provide increasing levels of illumination in response to state changes associated with sensed motion in the building.

20 Claims, 11 Drawing Sheets

(56) References Cited

U.S. PATENT DOCUMENTS

| | | |
|---|---|---|
| 2011/0060701 A1 | 3/2011 | Verfuerth et al. |
| 2011/0146669 A1 | 6/2011 | Bartol et al. |
| 2011/0187271 A1* | 8/2011 | Bouws et al. ............. 315/130 |
| 2011/0235317 A1 | 9/2011 | Verfuerth et al. |
| 2011/0279063 A1 | 11/2011 | Wang et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0081906 A1 | 4/2012 | Verfuerth et al. |
| 2012/0167957 A1 | 7/2012 | Verfuerth et al. |
| 2012/0182729 A1 | 7/2012 | Verfuerth et al. |
| 2012/0203601 A1 | 8/2012 | Verfuerth et al. |
| 2012/0209755 A1 | 8/2012 | Verfuerth et al. |
| 2012/0233045 A1 | 9/2012 | Verfuerth et al. |

\* cited by examiner

NO MOTION
STANDBY MODE
HIF & LED OFF

TRANSIENT MOTION
LOW LEVEL LIGHTING MODE
ONLY LED ON

SUSTAINED MOTION
HIGH LEVEL LIGHTING MODE
HIF & LED ON

SYSTEMS AND METHOD FOR LIGHTING AISLES

CROSS-REFERENCE TO RELATED PATENT APPLICATIONS

This application claims the benefit of and priority to U.S. Provisional Application No. 61/466,411, filed Mar. 22, 2011.

BACKGROUND

Warehouses, retail stores, manufacturing plants, or other types of buildings (or outdoor spaces) are often organized to include aisles. It is challenging and difficult to light aisles for energy efficiency and so that workers using the aisles have proper lighting (e.g., enough for the task to be completed by the workers).

SUMMARY

One embodiment of the invention relates to a lighting fixture for energy efficient aisle lighting in a building. The lighting fixture includes processing electronics configured to cause the lighting fixture to provide increasing levels of illumination in response to state changes associated with sensed motion in the building. The state changes include (a) a transition from a no motion state to a local motion state (i.e., transient motion); and (b) a transition from the local motion state (i.e., transient motion) to a sustained motion state.

Another embodiment of the invention relates to a system for energy efficient lighting of an aisle in a building. The system includes a plurality of lighting fixtures, wherein each of the plurality of lighting fixtures includes a motion sensor, transceiver, and processing electronics. The processing electronics for each lighting fixture are configured to cause the respective lighting fixture to provide increasing levels of illumination in response to state change associated with motion sensed by the motion sensor. The state changes include (a) a transition from a no motion state to a local motion state and (b) a transition from the local motion state to a sustained motion state.

Another embodiment of the invention relates to a method for providing energy efficient lighting of an aisle in a building. The method includes using a motion sensor and processing electronics coupled to a first lighting fixture to distinguish between transient motion and sustained motion. The method further includes at the first lighting fixture, transitioning from a transient motion state to a sustained motion state in response to a determination of sustained motion. The method further includes at the first lighting fixture, transitioning from a no motion state to a local motion state in response to a determination of local motion.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, a system of lighting fixtures is configured to control an aisle, set of aisles, or other building spaces in a manner that saves energy and provides for adequate worker lighting. While the systems and methods described herein are described with reference to aisle lighting, in some embodiments the systems and methods may also be applied to any type of building space where a distinction between a transient motion state and a sustained motion state may be beneficial. For example, each building space (e.g., rack aisles, specific production spaces, office, storage, shipping, receiving, hallway/traffic, etc.) may be organized into one of three categories (general, task, aisle). In an exemplary embodiment, motion sensed by a lighting fixture or a plurality of lighting fixtures are used to transition fixtures from state-to-state automatically and without reliance on live user input or a centralized controller. Advantageously, many of the embodiments described herein can therefore operate without 100% reliance/uptime on data communication networks or links from the furthest sensors or lighting fixtures in the building back to a centralized controller.

Each lighting fixture includes processing electronics for causing the lighting fixture to provide increasing levels of illumination in response to state changes associated with sensed motion nearby the fixture. In an exemplary embodiment, the processing electronics are configured to effect at least three states: (1) a no motion state wherein the lighting fixture is off, providing a minimum level of illumination, or providing a low level of illumination; (2) a transient motion or 'local' motion state wherein the lighting fixture provides a low-to-medium amount of illumination (e.g., sufficient for safe travel through the area); and (3) a sustained motion state wherein the lighting fixture provides a high level of lighting (e.g., a level desirable for supporting a high level of work productivity and safety).

Figure 1A:
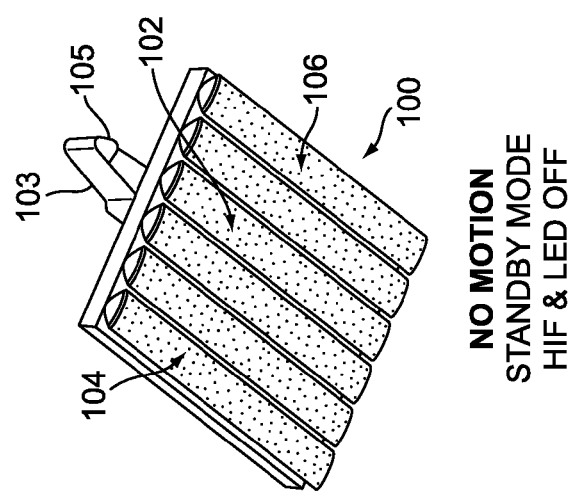
FIGS. 1A-C illustrate three different states of a lighting fixture, according to an exemplary embodiment.
Figure 1B:
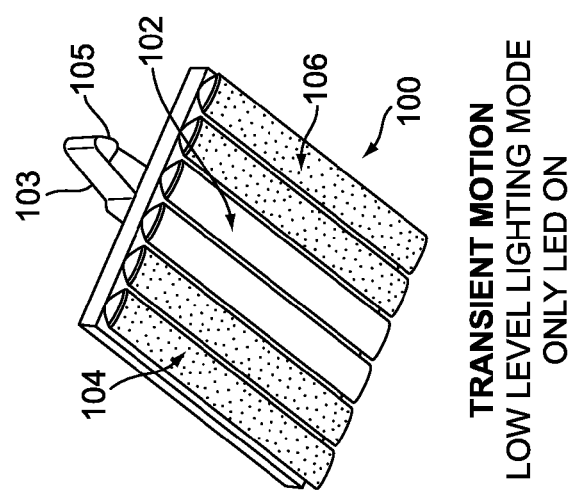
Figure 1C:
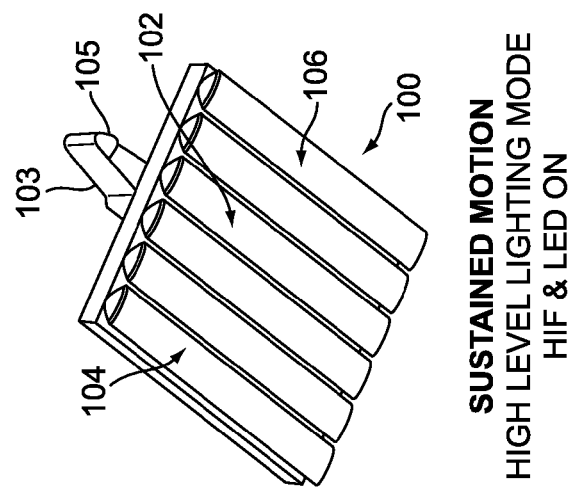

Referring now to FIGS. 1A-1C, three different states of a lighting fixture 100 are illustrated, according to an exemplary embodiment. Lighting fixture 100 is shown to include a light emitting diode (LED) section 102 and two high intensity fluorescent (HIF) lighting sections 104 and 106. It should be appreciated that the methods described herein could be applied to any type or mixture of lighting technology able to provide at least three different light levels (low/off, medium, high). In FIG. 1A, lighting fixture 100 is in a no motion state. In the example of FIG. 1A, a no motion state results in the entirety of the lighting fixture remaining in a standby mode wherein the HIF sections 104, 106 as well as the LED section 102 are off. Lighting fixture 100 is illustrated in a transient motion state in FIG. 1B. In the example of FIG. 1B, a transient motion state results in the LED section 102 being 'on', while the HIF sections 104, 106 are off, to provide a low level of illumination. Lighting fixture 100 is illustrated in a sustained motion state in FIG. 1C. In the example of FIG. 1C, a sustained motion state results in the HIF sections 104, 106 being on, in addition to the LED section 102 being on, to provide a high level of illumination. Lighting fixture 100 further includes a controller 103 configured to control operation of the lights (e.g., determine the state of the lights) and a motion sensor 105 configured to detect nearby motion and to provide controller 103 with motion information.

In some embodiments, the transient motion state is entered when local motion (e.g., motion actually sensed by a motion sensor local to a lighting fixture) is detected but the local motion has not yet been sustained for a period of time (which would result in a sustained motion state). In the present disclosure, the phrase 'a local motion state' and 'a transient motion state' may be used interchangeably and refer to the same state.

Figure 2A:
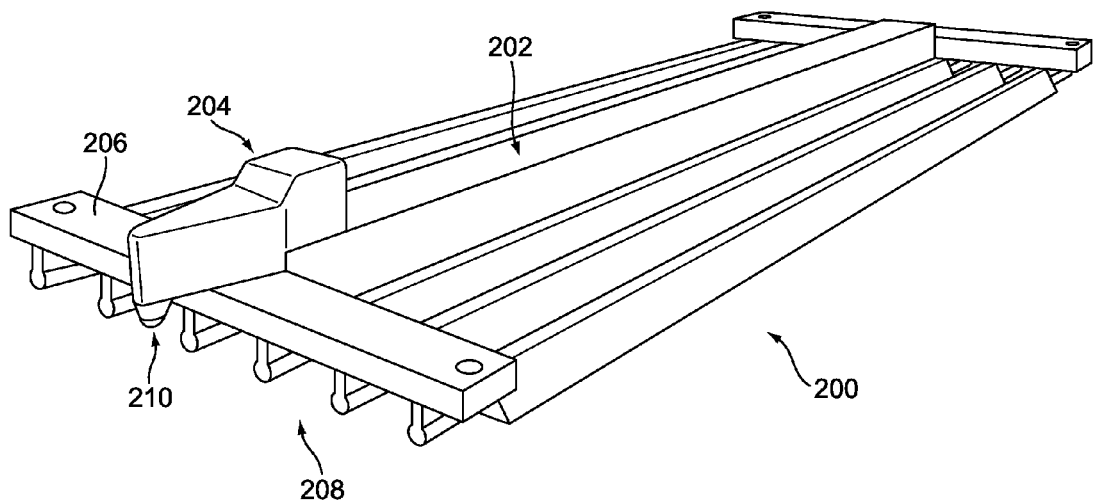
FIG. 2A is a perspective overhead view of a lighting fixture, according to an exemplary embodiment.

Referring now to FIG. 2A, a perspective overhead view of an exemplary lighting fixture 200 is illustrated, according to an exemplary embodiment. Lighting fixture 200 does not include an LED section such as that shown in FIGS. 1A-1C, but lighting fixture 200 can provide at least the same three lighting states (i.e., low/off light associated with a no motion state, medium/intermediate illumination associated with a transient motion state, and a relatively high level of illumination associated with a sustained motion state) by step-dimming its HIF ballast 202 and lamps 208.

Lighting fixture 200 is shown to include a frame 206 that holds the ballast 202 and a plurality of lamps 208. Frame 206 can be coupled to one or more brackets, rails, hooks, or other mechanisms for holding frame 206 and therefore lighting fixture 200 in place for use. Ballast 202 is coupled to controller 204. Controller 204 includes processing electronics for controlling the state changes and lighting fixture behavior during the different states. Controller 204 is shown to include motion sensor 210. Controller 204 is configured to change states based on motion sensed by motion sensor 210.

Figure 2B:
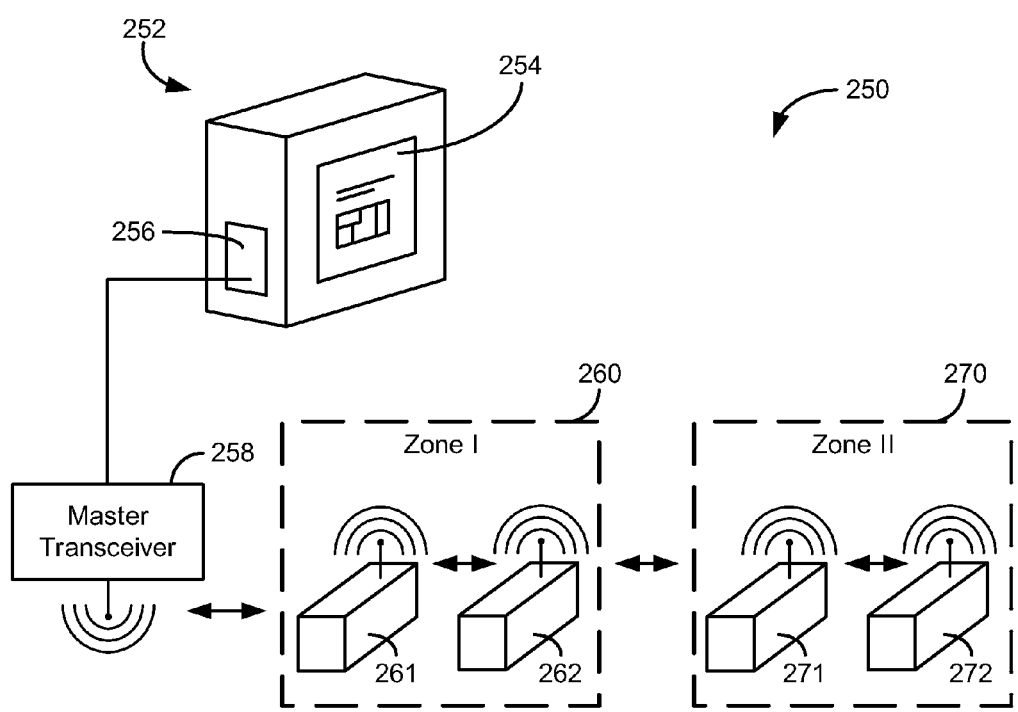
FIG. 2B is a block diagram of a facility lighting system for use with the lighting fixtures of FIGS. 1A-C and FIG. 2, according to an exemplary embodiment.

Referring now to FIG. 2B, a diagram of a facility lighting system 250 for use with lighting fixture 100 shown in FIGS. 1A-C and/or lighting fixture 200 shown in FIG. 2A is illustrated, according to an exemplary embodiment. Facility lighting system 250 is shown to include control computer 252 that is configured to conduct configuration and control activities relative to multiple lighting fixtures' controllers such as controller 103 of FIGS. 1A-C or controller 204 of FIG. 2A. While control computer 252 is shown in FIG. 2B, it should be appreciated that the lighting fixtures themselves includes electronics for conducting the occupancy/motion-based state transitions. Therefore, control computer 252 is not required in many exemplary embodiments. If control computer 252 is provided, it may be used to provide user interfaces for allowing a user to change zone boundaries, lighting schedules, default settings or to make other configuration/administrative changes.

Control computer 252 is configured to provide a graphical user interface to a local or remote electronic display screen for allowing a user to adjust configuration or control parameters, turn lighting fixtures on or off, change the motion sensitive modes assigned to a group or zone of lighting fixtures, or to otherwise affect the operation of lighting fixtures in a facility. For example, control computer 252 is shown to include touch screen display 254 for displaying such a graphical user interface and for allowing user interaction (e.g., input and output) with control computer 252. Various exemplary graphical user interfaces for display on touch screen display 254 and control activities associated therewith are described in greater detail in application Ser. No. 12/550,270, assigned to Orion Energy Systems, Inc and titled "Lighting Fixture Control Systems and Methods." While control computer 252 is shown as housed within a wall-mountable panel, control computer 252 may alternatively be housed in or coupled to any other suitable computer casing or frame. In an exemplary embodiment, user interfaces provided by control computer 252 and display 254 allow users to reconfigure or reset aspects of the lighting system.

Referring further to FIG. 2B, control computer 252 is shown as connected to master transceiver 258 via communications interface 256. Master transceiver 258 may be a radio frequency transceiver configured to provide wireless signals to a network of controllers such as controller 204. In FIG. 2B, master transceiver 258 is shown in bi-directional wireless communication with a plurality of lighting fixture controllers 261, 262, 271, and 272. FIG. 2B further illustrates controllers 261 and 262 forming a first logical group 260 identified as "Zone I" and controllers 271 and 272 forming a second logical group 270 identified as "Zone II." Control computer 252 is configured to provide different processing, different commands, or different modes for "Zone I" relative to "Zone II." While control computer 252 is configured to complete a variety of control activities for lighting fixture controllers 261, 262, 271, 272, in many exemplary embodiments of the present disclosure, each controller associated with a lighting fixture (e.g., controllers 261, 262, 271, 272) includes circuitry configured to provide a variety of "smart" or "intelligent features" that are either independent of control computer 252 or operate in concert with control computer 252. A detailed block diagram of such a controller is shown in FIG. 3.

Figure 3:
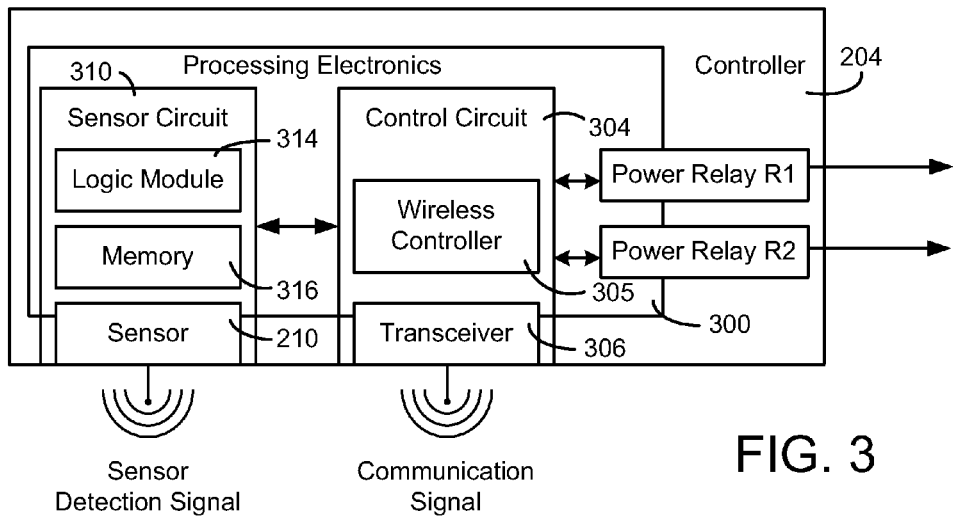
FIG. 3 is a detailed block diagram of the controller of the facility lighting system of FIG. 2B, according to an exemplary embodiment.

Referring now to FIG. 3, a detailed block diagram of controller 204 is shown, according to an exemplary embodiment. Controller 204 is generally configured to include circuitry configured with an algorithm to control on/dim/off cycling of connected lighting fixtures, an algorithm to log usage information for the lighting fixture, an algorithm configured to prevent premature restrikes to limit wear on the lamps and ballast, and/or other algorithms for allowing controller 204 to send and receive commands or information to/from other peer devices (e.g., other lighting fixture controllers) or to/from the master controller.

Controller 204 is shown to include power relays R1 and R2 configured to controllably switch on, increase, decrease, or switch off high voltage power outputs that may be provided to a first ballast (e.g., a ballast for HIF lamps) and a second ballast (e.g., a ballast for a set of LEDs). In other exemplary embodiments, power relays R1, R2 may be configured to provide a low voltage control signal, optical signal, or otherwise to the lighting fixture which may cause one or more ballasts, lamps, and/or circuits of the lighting fixture to turn on, dim, or turn off.

As power relays R1 and R2 are configured to provide high voltage power switching to varying lighting fixture ballasts, controller 204 and relays R1/R2 may include a port, terminal, receiver, or other input for receiving power from a high voltage power source. In embodiments where a relatively low voltage or no voltage control signal (e.g., optical) is provided from relays R1, R2, power for circuitry of controller 204 may be received from a power source provided to the lighting fixtures or from another source. In any embodiment of controller 204, appropriate power supply circuitry (e.g., filtering circuitry, stabilizing circuitry, etc.) may be included with controller 204 to provide power to the components of controller 204 (e.g., relays R1 and R2).

Referring still to FIG. 3, controller 204 is shown to include processing electronics 300. Processing electronics 300 generally utilizes electronics circuits and components (e.g., control circuits, relays, etc.) to effect the control activities described herein. In the example shown in FIG. 3, processing electronics 300 is embodied as a circuit (spread over one or more printed circuit boards) including control circuit 304. Control circuit 304 receives and provides data or control signals from/to power relays R1 and R2 and sensor circuit 310. Control circuit 304 is configured to cause one or more lamps of the lighting fixture to turn on and off (or dim) via control signals sent to power relays R1 and R2. For example, control circuit 304 can make a determination that an "on" or "off" signal should be sent to power relays R1 or R2 based on inputs received from wireless controller 305 or sensor circuit 310. By way of another example, a command to turn the lighting fixture "off" may be received at wireless transceiver 306 and interpreted by wireless controller 305. Upon recognizing the "off" command, wireless controller 305 provides an appropriate control signal to control circuit 304 which causes control circuit 304 to switch one or more of power relays R1, R2 off. Similarly, when sensor circuit 310 including sensor 210 experiences an environmental condition, logic module 314 may determine whether or not controller 204 and control circuit 304 should change "on/off" states of one or more of the relays R1, R2. For example, if motion is detected by sensor 210 and sensor circuit 310, logic module 314 may determine that control circuit 304 should change states such that power relay R1 is "on." If sustained motion is detected by sensor 210 and sensor circuit 310, logic module 314 may determine that control circuit 304 should change states such that power relay R2 is "on" in addition to power relay R1 (providing a high level of illumination on the sustained motion activity). Other control decisions, logic and activities provided by controller 204 and the components thereof are described below and with reference to other Figures.

When or after control decisions based on sensor 210 or commands received at wireless transceiver 306 are made, in some exemplary embodiments, logic module 314 is configured to log usage information for the lighting fixture in memory 316. For example, if control circuit 304 causes power relays R1 and R2 to change states such that the lighting fixture turns on or off, control circuit 304 may inform logic module 314 of the state change and logic module 314 may log usage information based on the information from control circuit 304. The form of the logged usage information can vary for different embodiments. For example, in some embodiments, the logged usage information includes an event identifier (e.g., "on", "off", cause for the state change, etc.) and a timestamp (e.g., day and time) from which total usage may be derived. In other embodiments, the total "on" time for the lighting fixture (or lamp set) is counted such that only an absolute number of hours that the lamp has been on (for whatever reason) has been tracked and stored as the logged usage information. In addition to logging or aggregating temporal values, each logic module 314 may be configured to process usage information or transform usage information into other values or information. For example, in some embodiments, time-of-use information is transformed by logic module 314 to track the energy used by the lighting fixture (e.g., based on bulb ratings, known energy draw of the fixture in different on/off/partial on modes, etc.). In some embodiments, each logic module 314 will also track how much energy savings the lighting fixture is achieving relative to a conventional lighting fixture, conventional control logic, or relative to another difference or change of the lighting fixture. For the purposes of many embodiments of this disclosure, any such information relating to usage for the lighting fixture may be considered logged "usage information." In other embodiments, the usage information logged by module 314 is limited to on/off events or temporal aggregation of on states; in such embodiments energy savings calculations or other calculations may be completed by control computer 252 or another remote device.

In an exemplary embodiment, controller 204 (e.g., via wireless transceiver 306) is configured to transmit the logged usage information to remote devices such as control computer 252. Wireless controller 305 may be configured to recall the logged usage information from memory 316 at periodic intervals (e.g., every hour, once a day, twice a day, etc.) and to provide the logged usage information to wireless transceiver 306 at the periodic intervals for transmission back to control computer 252. In other embodiments, control computer 252 (or another network device) transmits a request for the logged information to wireless transceiver 306 and the request is responded to by wireless controller 305 by transmitting back the logged usage information. In a preferred embodiment a plurality of controllers such as controller 204 asynchronously collect usage information for their fixture and control computer 252, via request or via periodic transmission of the information by the controllers, gathers the usage information for later use.

Wireless controller 305 may also be configured to handle situations or events such as transmission failures, reception failures, and the like. Wireless controller 305 may respond to such failures by, for example, operating according to a retransmission scheme or another transmit failure mitigation scheme. Wireless controller 305 may also control any other modulating, demodulating, coding, decoding, routing, or other activities of wireless transceiver 306. For example, controller 204's control logic (e.g., controlled by logic module 314 and/or control circuit 304) may periodically include making transmissions to other controllers in a zone, making transmissions to particular controllers, or otherwise. Such transmissions can be controlled by wireless controller 305 and such control may include, for example, maintaining a token-based transmission system, synchronizing clocks of the various RF transceivers or controllers, operating under a slot-based transmission/reception protocol, or otherwise.

Referring still to FIG. 3, sensor 210 may be an infrared sensor, an optical sensor, a camera, a temperature sensor, a photodiode, a carbon dioxide sensor, or any other sensor configured to sense environmental conditions such as a lighting level or human occupancy of a space. For example, in one exemplary embodiment, sensor 210 is a motion sensor and logic module 314 is configured to determine whether control circuit 304 should change states (e.g., change the state of power relays R1 and R2) based on whether motion is detected by sensor 210 (e.g., detected motion reaches or exceeds threshold value). In the same or other embodiments, logic module 314 may be configured to use the signal from the sensor 210 to determine an ambient lighting level. Logic module 314 may then determine whether to change states based on the ambient lighting level. For example, logic module 314 may use a condition such as time of day in addition to ambient lighting level to determine whether to turn the lighting fixture off or on. During a critical time of the day (e.g., when a staffed assembly line is moving), even if the ambient lighting level is high, logic module 314 may refrain from turning the lighting fixture off. In another embodiment, by way of further example, logic module 314 is configured to provide a command to control circuit 304 that is configured to cause control circuit 304 to turn the one or more lamps of the fluorescent lighting fixture on when logic module 314 detects motion via the signal from sensor 210 and when logic circuit 314 determines that the ambient lighting level is below a threshold setpoint.

Referring yet further to FIG. 3, control circuit 304 is configured to prevent damage to lamps 108 or 110 from manual or automatic control activities. Particularly, control circuit 304 may be configured to prevent on/off cycling of sections 102, 104, 106 by holding the lamps of the sections in an "on" state for a predefined period of time (e.g., thirty minutes, fifteen minutes, etc.) even after the condition that caused the lamp to turn on is no longer true. Accordingly, if, for example, motion or a low ambient lighting level causes control circuit 304 to turn sections 102, 104, and/or 106 on but then the motion and/or ambient lighting level suddenly increases (a worker enters the zone or the sun comes out), control circuit 304 may keep the lamps on (even though the 'on' condition expired) for a predetermined period of time so that the lamps are taken through their preferred cycle. Similarly, in an alternative embodiment, control circuit 304 may be configured to hold the lamp in an "off" state for a predefined period of time since the lamp was last turned off to ensure that the lamp is given time to cool or otherwise settle after the last "on" state.

Referring yet further to FIG. 3, logic module 314 or control circuit 304 may be configured to include a re-strike violation module (e.g., in memory 316) that is configured to prevent logic module 314 from commanding control circuit 304 to cause the fluorescent lamps to turn on while a re-strike time is counted down. The re-strike time may correspond with a maximum cool-down time for the lamp, allowing the lamp to experience its preferred strike-up cycle even if a command to turn the lamp back on is received at wireless transceiver 306. In other embodiments, logic module 314 or control circuit 304 may be configured to prevent rapid on/off switching due to sensed motion, another environmental condition, or a sensor or controller error. Logic module 314 or control circuit 304 may be configured to, for example, entirely discontinue the on/off switching based on inputs received from sensor 210 by analyzing the behavior of the sensor, the switching, and logged usage information. By way of further example, logic circuit 314 or control circuit 304 may be configured to discontinue the on/off switching based on a determination that switching based on the inputs from the sensor has occurred too frequently (e.g., exceeding a threshold number of "on" switches within a predetermined amount of time, undesired switching based on the time of day or night, etc.). Logic module 314 or control circuit 304 may be configured to log or communicate such a determination. Using such configurations, logic module 314 and/or control circuit 304 are configured to self-diagnose and correct undesirable behavior that would otherwise continue occurring based on the default, user, or system-configured settings.

According to one embodiment, a self-diagnostic feature would monitor the number of times that a fixture or device was instructed to turn on (or off) based upon a signal received from a sensor (e.g. motion, ambient light level, etc.). If the number of instructions to turn on (or off) exceeded a predetermined limit during a predetermined time period, logic module 314 and/or control circuit 304 could be programmed to detect that the particular application for the fixture or device is not well-suited to control by such a sensor (e.g. not an optimum application for motion control or ambient light-based control, etc.), and would be programmed to disable such a motion or ambient light based control scheme, and report/log this action and the basis. For example, if the algorithm is based on more than four instructions to turn on (or off) in a 24 hour period, and the number of instructions provided based on signals from the sensor exceeds this limit within this period, the particular sensor-based control function would be disabled, as not being optimally suited to the application and a notification would be logged and provided to a user or facility manager. Of course, the limit and time period may be any suitable number and duration intended to suit the operational characteristics of the fixture/device and the application. In the event that a particular sensor-based control scheme in a particular zone is disabled by the logic module and/or control circuit, the fixture or device is intended to remain operational in response to other available control schemes (e.g. other sensors, time-based, user input or demand, etc.). The data logged by the logic module and/or control circuit may also be used in a 'learning capacity' so that the controls may be more optimally tuned for the fixtures/devices in a particular application and/or zone. For example, the logic module and/or control circuit may determine that disablement of a particular sensor-based control feature occurred due to an excessive number of instructions to turn on (or off) based on signals from a particular sensor that occurred within a particular time window, and may be reprogrammed to establish an alternate monitoring duration that excludes this particular time window for the particular sensor-based control scheme to 'avoid' time periods that are determined to be problematic. This ability to learn or self-update is intended to permit the system to adjust itself to update the sensor-based control schemes to different time periods that are more optimally suited for such a control scheme, and to avoid time periods that are less optimum for such a particular sensor-based control scheme.

Figure 4:
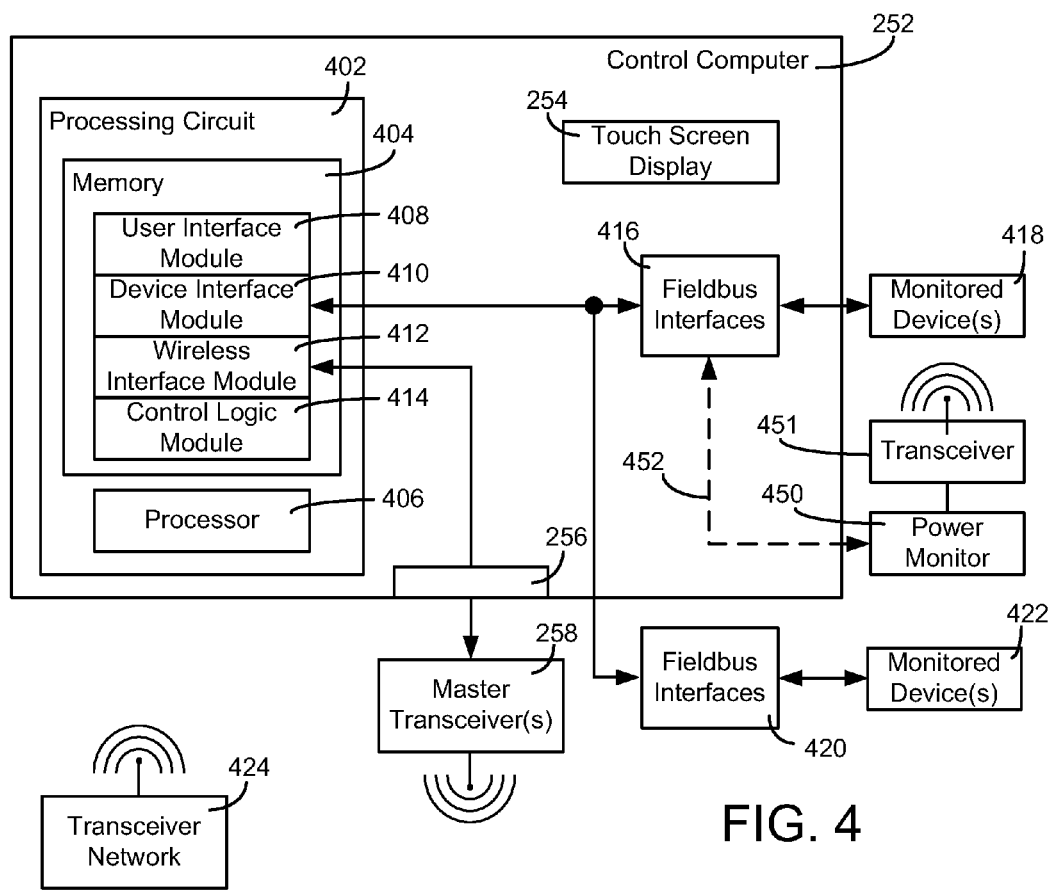
FIG. 4 is a detailed block diagram of the control computer of the facility lighting system of FIG. 2B, according to an exemplary embodiment.

Referring now to FIG. 4, a more detailed block diagram of control computer 252 is shown, according to an exemplary embodiment. Control computer 252 may be configured as the "master controller" described in U.S. application Ser. No.

12/240,805, filed Sep. 29, 2008, and incorporated herein by reference in its entirety. Control computer 252 is generally configured to receive user inputs (e.g., via touchscreen display 254) and to set or change settings of lighting system 250 based on the user inputs.

Referring further to FIG. 4, control computer 252 is shown to include processing circuit 402 including memory 404 and processor 406. In an exemplary embodiment, control computer 252 and more particularly processing circuit 402 are configured to run a Microsoft Windows Operating System (e.g., XP, Vista, etc.) and are configured to include a software suite configured to provide the features described herein. The software suite may include a variety of modules (e.g., modules 408-414) configured to complete various activities of control computer 252. Modules 408-414 may be or include computer code, analog circuitry, one or more integrated circuits, or another collection of logic circuitry. In various exemplary embodiments, processor 406 may be a general purpose processor, a specific purpose processor, a programmable logic controller (PLC), a field programmable gate array, a combination thereof, or otherwise and configured to complete, cause the completion of, and/or facilitate the completion of the activities of control computer 252 described herein. Memory 404 may be configured to store historical data received from lighting fixture controllers or other building devices, configuration information, schedule information, setting information, zone information, or other temporary or archived information. Memory 404 may also be configured to store computer code for execution by processor 406. When executed, such computer code (e.g., stored in memory 404 or otherwise, script code, object code, etc.) configures processing circuit 402, processor 406 or more generally control computer 252 for the activities described herein.

Touch screen display 254 and more particularly user interface module 408 are configured to allow and facilitate user interaction (e.g., input and output) with control computer 252. It should be appreciated that in alternative embodiments of control computer 252, the display associated with control computer 252 may not be a touch screen, may be separated from the casing housing the control computer, and/or may be distributed from the control computer and connected via a network connection (e.g., Internet connection, LAN connection, WAN connection, etc.). Further, it should be appreciated that control computer 252 may be connected to a mouse, keyboard, or any other input device or devices for providing user input to control computer 252. Control computer 252 is shown to include a communications interface 256 configured to connect to a wire associated with master transceiver 258.

Communications interface 256 may be a proprietary circuit for communicating with master transceiver 258 via a proprietary communications protocol. In other embodiments, communications interface 256 may be configured to communicate with master transceiver 258 via a standard communications protocol. For example, communications interface 256 may include Ethernet communications electronics (e.g., an Ethernet card) and an appropriate port (e.g., an RJ45 port configured for CAT5 cabling) to which an Ethernet cable is run from control computer 252 to master transceiver 258. Master transceiver 258 may be as described in U.S. application Ser. Nos. 12/240,805, 12/057,217, or 11/771,317, which are each incorporated herein by reference. Communications interface 256 and more generally master transceiver 258 are controlled by logic of wireless interface module 412. Wireless interface module 412 may include drivers, control software, configuration software, or other logic configured to facilitate communications activities of control computer 252 with lighting fixture controllers. For example, wireless interface module 412 may package, address format, or otherwise prepare messages for transmission to and reception by particular controllers or zones. Wireless interface module 412 may also interpret, route, decode, or otherwise handle communications received at master transceiver 258 and communications interface 256.

Referring still to FIG. 4, user interface module 408 may include the software and other resources for the handling of automatic or user inputs received at the graphical user interfaces of control computer 252. While user interface module 408 is executing and receiving user input, user interface module 408 may interpret user input and cause various other modules, algorithms, routines, or sub-processes to be called, initiated, or otherwise affected. For example, control logic module 414 and/or a plurality of control sub-processes thereof may be called by user interface module 408 upon receiving certain user input events. User interface module 408 may also be configured to include server software (e.g., web server software, remote desktop software, etc.) configured to allow remote access to touch screen display 254. User interface module 408 may be configured to complete some of the control activities described herein rather than control logic module 414. In other embodiments, user interface module 408 merely drives the graphical user interfaces and handles user input/output events while control logic module 414 controls the majority of the actual control logic.

Control logic module 414 may be the primary logic module for control computer 252 and may be the main routine that calls, for example, modules 408, 410, etc. Control logic module 414 may generally be configured to provide lighting control, energy savings calculations, demand/response-based control, load shedding, load submetering, HVAC control, building automation control, workstation control, advertisement control, power strip control, "sleep mode" control, or any other types of control. In an exemplary embodiment, control logic module 414 operates based off of information stored in one or more databases of control computer 252 and stored in memory 404 or another memory device in communication with control computer 252. The database may be populated with information based on user input received at graphical user interfaces and control logic module 414 may continuously draw on the database information to make control decisions. For example, a user may establish any number of zones, set schedules for each zone, create ambient lighting parameters for each zone or fixture, etc. This information is stored in the database, related (e.g., via a relational database scheme, XML sets for zones or fixtures, or otherwise) and recalled by control logic module 414 as control logic module 414 proceeds through its various control algorithms.

Control logic module 414 may include any number of functions or sub-processes. For example, a scheduling sub-process of control logic module 414 may check at regular intervals to determine if an event is scheduled to take place. When events are determined to take place, the scheduling sub-process or another routine of control logic module 414 may call or otherwise use another module or routine to initiate the event. For example, if the schedule indicates that a zone should be turned off at 5:00 pm, then when 5:00 pm arrives the scheduling sub-process may call a routine (e.g., of wireless interface module) that causes an "off" signal to be transmitted by master transceiver 258. Control logic module 414 may also be configured to conduct or facilitate the completion of any other process, sub-process, or process steps conducted by control computer 252 described herein.

Referring further to FIG. 4, device interface module 410 facilitates the connection of one or more field devices, sensors, or other inputs not associated with master transceiver 258. For example, fieldbus interfaces 416 and 420 may be configured to communicate with any number of monitored devices 418 and 422. The communication may be according to a communications protocol which may be standard or proprietary and/or serial or parallel. Fieldbus interfaces 416, 420 can be or include circuit cards for connection to processing circuit 402, jacks or terminals for physically receiving connectors from wires coupling monitored devices 418 and 422, logic circuitry or software for translating communications between processing circuit 402 and monitored devices 418 and 422, or otherwise. In an exemplary embodiment, device interface module 410 handles and interprets data input from the monitored devices and controls the output activities of fieldbus interfaces 416 and 420 to monitored devices 418 and 422.

Fieldbus interfaces 416 and 420 and device interface module 410 may also be used in concert with user interface module 408 and control logic module 414 to provide control to the monitored devices 418 and 422. For example, monitored devices 418 and 422 may be mechanical devices configured to operate a motor, one or more electronic valves, one or more workstations, machinery stations, a solenoid or valve, or otherwise. Such devices may be assigned to zones similar to the lighting fixtures described above and below or controlled independently. User interface module 408 may allow schedules and conditions to be established for each of devices 418 and 422 so that control computer 252 may be used as a comprehensive energy management system for a facility. For example, a motor that controls the movement of a spinning advertisement may be coupled to the power output or relays of a controller very similar if not identical to controller 204. This controller may be assigned to a zone (e.g., via user interfaces at touchscreen display 254) and provided a schedule for turning on and off during the day. In another embodiment, the electrical relays of the controller may be coupled to other building devices such as video monitors for informational display, exterior signs, task lighting, audio systems, or other electrically operated devices.

Referring further to FIG. 4, power monitor 450 is shown as coupled to fieldbus interfaces 416 in an exemplary embodiment. However, power monitor 450 may also or alternatively be coupled to its own controller or RF transceiver 451 for communicating with master transceiver 258. Power monitor 450 may generally be configured to couple to building power resources (e.g., building mains input, building power meter, etc.) and to receive or calculate an indication of power utilized by the building or a portion of the building. This input may be received in a variety of different ways according to varying embodiments. For example, power monitor 450 may include a current transformer (CT) configured to measure the current in the mains inlet to a building, may be coupled to or include a pulse monitor, may be configured to monitor voltage, or may monitor power in other ways. Power monitor 450 is intended to provide "real time" or "near real time" monitoring of power and to provide the result of such monitoring to control computer 252 for use or reporting. When used with power monitor 450, control logic module 414 may be configured to include logic that sheds loads (e.g., sends off signals to lighting fixtures via a lighting fixture controller network, sends off signals to monitored devices 418 and 422, adjusts ambient light setpoints, adjusts schedules, shuts lights off according to a priority tier, etc.) to maintain a setpoint power meter level or threshold. In other exemplary embodiments, control logic module 414 may store or receive pricing information from a utility and shed loads if the metered power usage multiplied by the pricing rate is greater than certain absolute thresholds or tiered thresholds. For example, if daily energy cost is expected to exceed $500 for a building, control logic module 414 may be configured to change the ambient light setpoints for the lighting fixtures in the building until daily energy cost is expected to fall beneath $500. In an exemplary embodiment, user interface module 408 is configured to cause a screen to be displayed that allows a user to associate different zones or lighting fixtures with different demand/response priority levels. Accordingly, a utility provider or internal calculation determines that a load should be shed, control logic module 414 will check the zone or lighting fixture database to shed loads of the lowest priority first while leaving higher priority loads unaffected.

Figure 5:
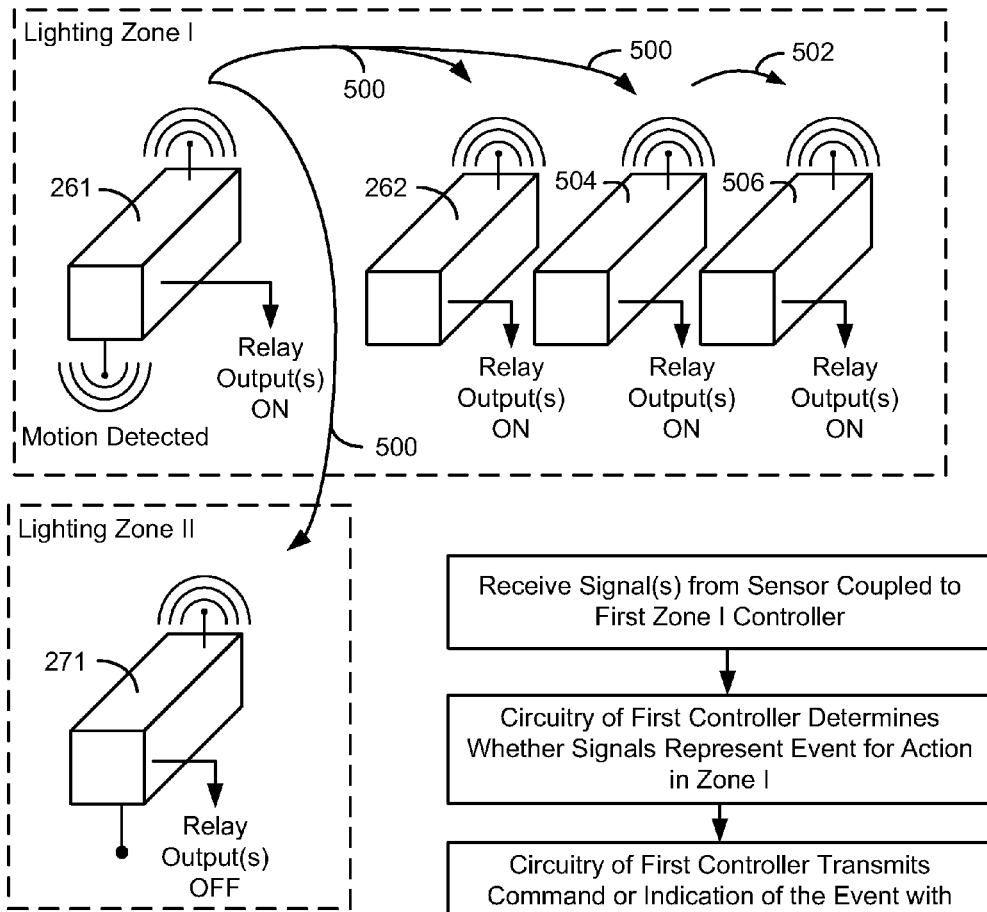
FIG. 5 illustrates an exemplary control activity for a system of controllers for a facility lighting system, according to an exemplary embodiment.

Referring now to FIG. 5, an exemplary control activity for a system of controllers as described herein is illustrated, according to an exemplary embodiment. As described in FIG. 2B, lighting fixtures (or more particularly controllers for lighting fixtures) can be grouped into zones. Rather than reporting motion, ambient light, or other sensed conditions back to master transceiver 258 for processing or action, controllers such as controller 204 may be configured to broadcast commands or conditions to other RF transceivers coupled to other controllers in the same zone. For example, in FIG. 5, lighting zone I includes four controllers. When motion is detected by sensor 210 of controller 204, logic module 314 and/or control circuit 304 causes wireless transceiver 306 to transmit an indication that motion was detected by the sensor. Accordingly, control circuits of the controllers receiving the indication can decide whether or not to act upon the indication of motion. The RF signals including an indication of motion may also include a zone identifier that receiving controllers can use to determine if the signal originated from their zone or another zone. In other exemplary embodiments, controller 204 may address messages to particular controllers (e.g., the addresses of neighbors or the addresses of other controllers in the zone). Logic module 314 may further be configured to cause the radio frequency transceiver to transmit commands to other radio frequency transceivers coupled to other fluorescent lighting fixtures. For example, logic module 314 and/or control circuit 304 may be configured to interpret a signal received at the radio frequency transceiver as indicating that motion was detected by another device in the zone. In an exemplary embodiment of the lighting fixture controller, some will be configurable as relay devices and when so configured, will relay any commands or information the controller receives from other zone controllers. Controller 504 is illustrated to be configured as such a relay device. When controller 504 receives broadcast 500 indicating motion from controller 261, controller 504 relays broadcast 500 via transmission 502 to other zone devices (e.g., controller 506). This way, an event such as motion can be propagated to each of the lighting fixtures in a zone without network traffic to controller 261 and/or without necessitating direct control of the lighting fixtures by controller 261. This activity may be configurable (e.g., via a GUI provided by control computer 252) so that only some controllers are relays, all controllers are relays, or so that no controllers are relays and only devices within range of the detecting controller act on its broadcasts. Further, the relay or rebroadcast can be address-based or more similar to a true broadcast. For example, in an address-based relay, the controller serving as a relay may know the addresses of certain network controllers to which to transmit the relayed information. In another example, the broadcast may be general and not addressed to any particular controller, controllers, or zone.

To implement zone control activities, each controller may be configured to store a lighting zone value in memory (e.g., memory 316). This value may be used, for example, to determine whether another device sending a command is associated with the lighting zone value stored in memory. For example, controller 271 may include a lighting zone value of "II" in memory and controller 261 may include data representative of controller 261's lighting zone value (e.g., "I") with its transmission indicating that motion was detected. When controller 271 receives the lighting zone value, controller 271 (e.g., a control circuit or logic circuit thereof) may compare "I" and "II" and make a determination that controller 271 will not act on the received indication of motion (i.e., controller 271 leaves its relays off while all of the controllers in zone I switch their relays on).

Figure 6:
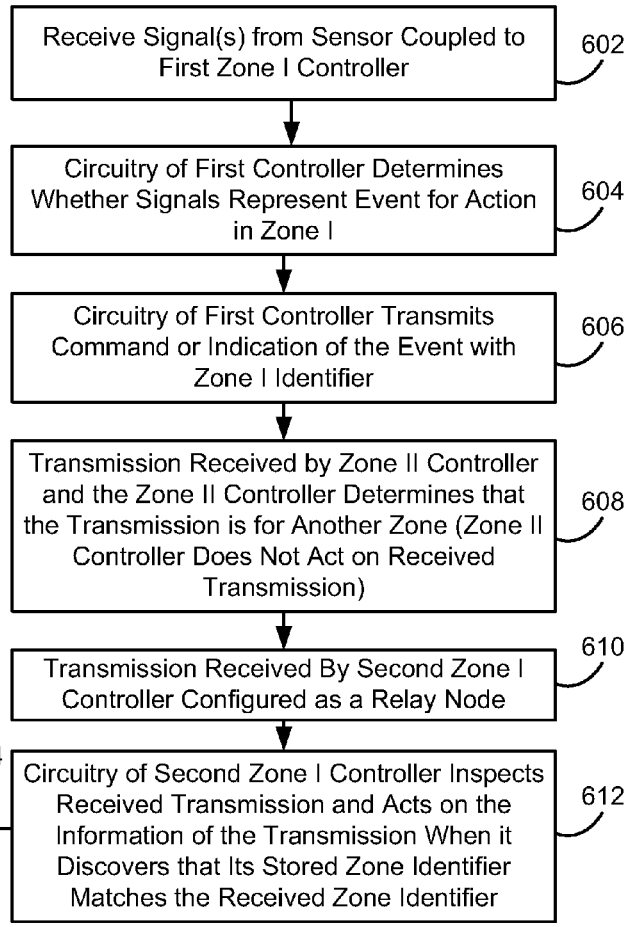
FIG. 6 is a flow chart of a process for controlling multiple lighting fixtures in a zone based on sensor input, according to an exemplary embodiment.

Referring now to FIG. 6, a flow chart of a process 600 for controlling multiple lighting fixtures in a zone based on sensor input is shown, according to an exemplary embodiment. Process 600 is shown to include receiving signals from a sensor (e.g., sensor 210) coupled to a first controller for a first zone (step 602). Once received, circuitry of the first controller can determine whether the received signals represent an event that should be acted upon (e.g., by changing lighting states, etc.) in the first zone (step 604). Process 600 is further shown to include using circuitry of the first controller to transmit a command and/or an indication of the event with a first zone identifier (step 606). The transmission is received by a controller in a second zone. Circuitry of the controller in the second zone determines that the transmission is for another zone and does not act on the received transmission (step 608). The transmission may also be received by a second controller for the first zone (step 610). Circuitry of the second controller for the first zone inspects the received transmission and acts on the information of the transmission when the controller discovers that its stored zone identifier matches the received zone identifier (step 612). The second controller for the first zone may also be configured as a relay node and to retransmit the received command or indication to other first zone controllers (e.g., controller 506).

Figure 7:
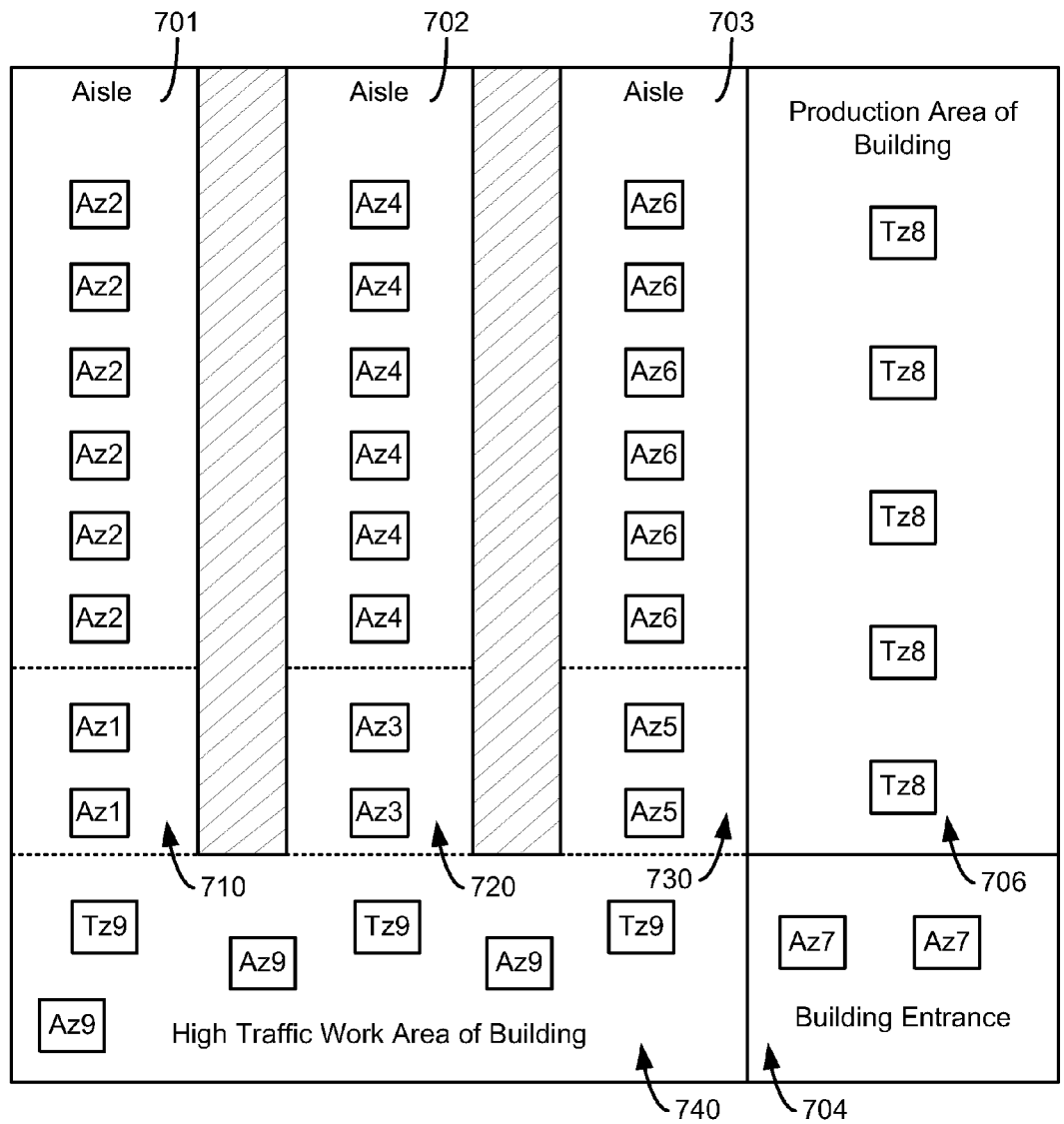
FIG. 7 illustrates how different lighting zones may be organized within a building having a facility lighting system, according to an exemplary embodiment.

FIG. 7 illustrates how different lighting zones may be organized within a building having aisles. In the example of FIG. 7, building entrance 704 is shown to include two lighting fixtures (labeled with Az7 in the illustration) assigned to a 'general' mode of operation and zone 7 of the building. Production area 706 of the building is shown to include five lighting fixtures (labeled with Tz8 in the illustration) assigned to a 'task' mode of operation and zone 8 of the building. High traffic work area 740 of the building includes some lighting fixtures set in a general mode of operation and others set in a task mode of operation (the lighting fixtures in a task mode of operation and associated zone 9 are labeled Tz9 in the illustration of FIG. 7 and the lighting fixtures in the general mode of operation and associated with zone 9 are labeled Az9).

The illustration of FIG. 7 further illustrates three aisles. Each aisle is shown as divided into two zones, a small forward zone near the front of the aisle (i.e., near the high traffic work area of the building) and a larger zone behind the small forward zone. Items that need to be frequently accessed may be placed in the small forward zone near the front of the aisle, while items that are less frequently accessed may be placed in the larger zone. Referring to aisle portion 710, two lighting fixtures are shown as installed within the aisle portion (labeled with Az1 in the illustration) and assigned to an 'aisle' mode of operation and zone 1 of the building. Referring to aisle portion 701, six lighting fixtures are shown as installed within the aisle portion (labeled with Az2 in the illustration) and assigned to an 'aisle' mode of operation and zone 2 of the building. Referring to aisle portion 720, two lighting fixtures are shown as installed within the aisle portion (labeled with Az3 in the illustration) and assigned to an 'aisle' mode of operation and zone 3 of the building. Referring further to aisle portion 702, six lighting fixtures are shown as installed within the aisle portion (labeled with Az4 in the illustration) and assigned to an 'aisle' mode of operation and zone 4 of the building. Referring to aisle portion 730, two lighting fixtures are shown as installed within the aisle portion (labeled with Az5 in the illustration) and assigned to an 'aisle' mode of operation and zone 5 of the building. Referring to aisle portion 703, six lighting fixtures are shown as installed within the aisle portion (labeled with Az6 in the illustration) and assigned to an 'aisle' mode of operation and zone 6 of the building. The general, task, and aisle modes of operation for a lighting fixture are described with reference to subsequent Figures.

Figure 8:
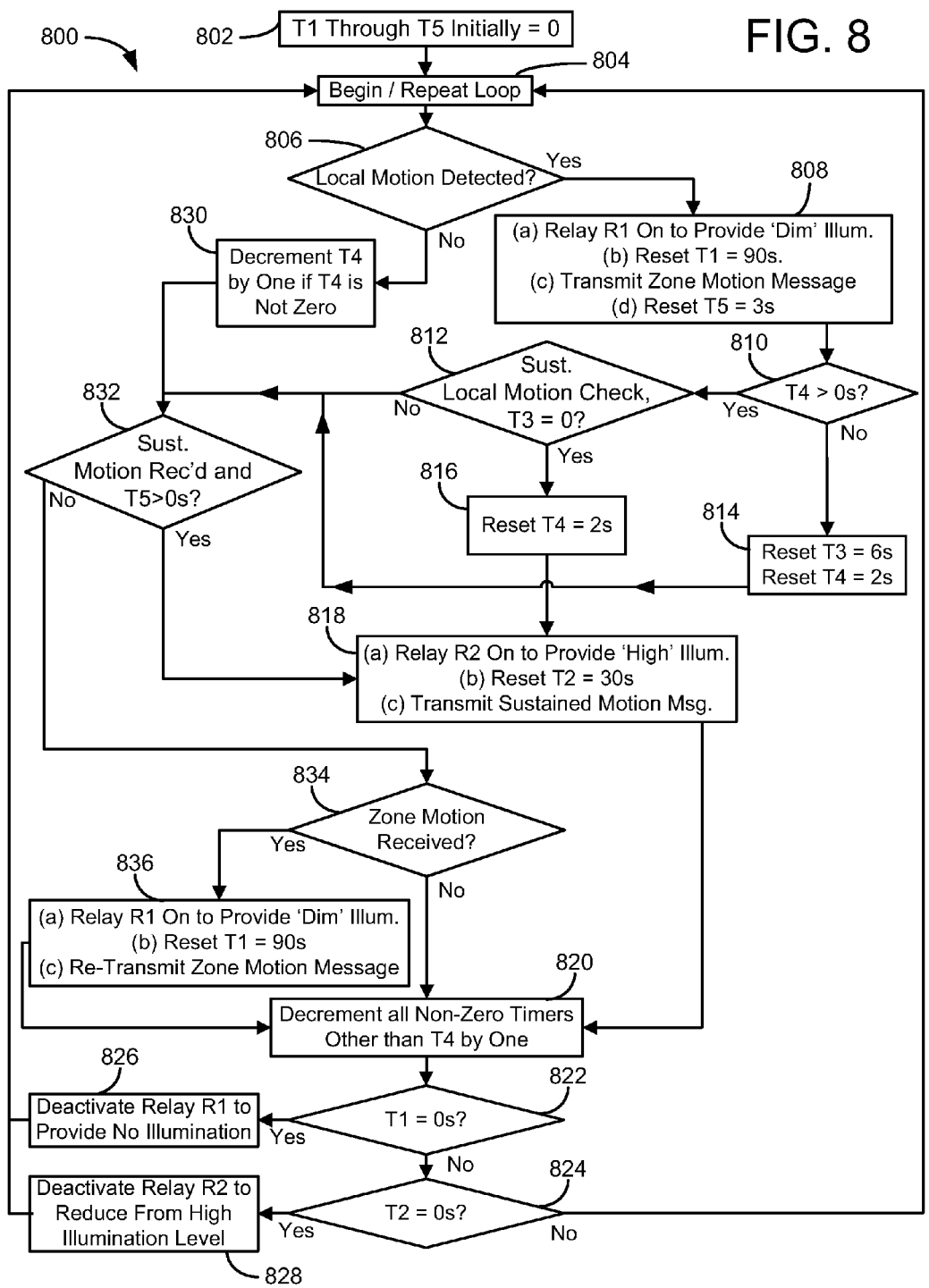
FIG. 8 is a flow chart of a process for providing an aisle lighting mode of operation using a lighting fixture controller and a system of similarly configured lighting fixtures in a zone, according to an exemplary embodiment.

Referring now to FIG. 8, a flow chart of a process 800 for providing an aisle mode of operation is shown. While a process 800 is illustrated and described with particularity, it should be noted that many different timings, checks, step orders, or other variations are contemplated and may fall within the scope of one or more appended claims. Process 800 can be executed by processing electronics 300 of controller 204 shown in FIG. 3 or by other processing electronics coupled to a lighting fixture. In an alternative embodiment, process 800 can be partially or entirely executed by processing electronics remote from the lighting fixture (e.g., a control computer 252). For example, in an alternative embodiment, some of the steps of process 800 may be executed by a lighting fixture's local controller and other of the steps of process 800 may be executed by control computer 252.

Process 800 is shown to begin at step 802 where timers or counters T1 through T5 are initially set to zero (step 802). Timers or counters T1 through T5 are variously used to control the timing of transitions into and out of varying lighting states. T1 represents a time period for which dim illumination should be provided by the lighting fixture. T2 represents a time period for which high illumination should be provided by the lighting fixture. T3 and T4 represent time periods which are used to represent periods of time where sustained local motion is detected. T5 represents a time period for which local motion has occurred. While particular timings are described with reference to process 800 and the other processes described herein, different state timings may be associated with varying exemplary embodiments.

At step 804, the primary aisle mode loop begins. It should be noted that, prior to starting the primary aisle mode loop at step 804, any number of additional steps may be conducted to warm up the lamp, conduct daily lamp "seasoning", or to conduct another start-up task. For example, the initial motion detected in a zone during a day may result in all lamps within the zone being turned high for one minute to ensure the daily lamp seasoning.

Once the loop is begun, process 800 can begin continually checking for whether local motion is detected (step 806). As described above with reference to FIG. 3, and according to an exemplary embodiment, sensor circuit 310 and sensor 210 can process infrared video signals to estimate whether significant movement (e.g., enough to be a human rather than a small animal) is occurring in the space covered by the sensor 210's sensor detection signal. In response to local motion being detected, activities including switching relay R1 (e.g., shown in FIG. 3) to be "on" to provide relatively 'dim' illumination from the lighting fixture are completed (step 808). In step 808, timer T1 is set/reset to equal 90 seconds. In step 808, also in response to the detection of local motion, the processing electronics of the lighting fixture (e.g., processing electronics 304 shown in FIG. 3) causes a communications interface (e.g., transceiver 306 of FIG. 3, a wired communications interface) to transmit a zone motion message to other lighting fixture controllers in the zone. Each time local motion is detected, T5 is reset to equal 3 seconds. It should be noted that relay R1 will stay 'on' while local motion is being detected. As will be noted below, because timer T1 is reset to 90 seconds each time local motion is detected, the lighting fixture will provide dim illumination for at least ninety seconds after local motion is detected.

At step 810, a check is conducted for whether T4 is greater than 0 seconds. T4 is used as a dwell timer such that a number of seconds (e.g., 2) can pass before the process 800 resets timer T3 that is used for checking whether the local motion is sustained in step 812. If T4 is not greater than zero seconds according to the check at step 810, T3 is reset to equal 6 seconds and T4 is reset to equal 2 seconds (step 814). If T4 is greater than zero seconds (meaning that motion has been detected within the T4 dwell time), then step 812 checks for whether the local motion has been sustained for a predetermined period of time (e.g., 6 seconds). In other words, step 812 checks for whether T3 has been counted down from 6 to zero.

If step 812 results in a determination that local motion has been sustained, then T4 is reset to 2 seconds at step 816. Further, in response to sustained local motion, relay R2 is caused to be 'on' providing a 'high' illumination level. T2 is reset to thirty seconds and a sustained motion message is transmitted from transceiver 306. As will be explained below, when T2 counts down to zero, relay R2 is deactivated. Therefore, in response to detected sustained local motion (e.g., detecting movement associated with a worker concentrating on making a product pull in an aisle location for longer than 6 seconds), the lighting fixture is caused to switch from a dim illumination state to a high or bright illumination state—providing the highest possible light level for the worker in the aisle. If local motion does not continue, the lighting fixture returns to a dim state after time T2 expires, saving energy when high illumination is no longer required due to worker activity.

At step 820, process 800 decrements all non-zero timers other than T4 by one. Steps 822 and 824 check for the expiration of timer T1 and T2, respectively. As described above, if T2 has expired, then (at step 828) relay R2 is deactivated to reduce the illumination level from high to dim (e.g., where T1 only is activated). If T1 has expired, then (at step 826) relay R1 is deactivated to reduce the illumination level from dim to off (or lower). After state changes at steps 826, 828, or after consecutive 'no' decisions at step 822, 824, the loop repeats at step 804.

As shown in FIG. 8, if local motion is not detected at step 806, then T4 is decremented by one (if T4 is not already zero) at step 830. At step 832, process 800 includes checking for whether a sustained motion received message has been received from a linked or nearby lighting fixture (e.g., a lighting fixture within the same zone). Step 832 also checks for whether T5 is greater than 0. If T5 is greater than zero, local motion has recently been detected by the lighting fixture at step 806. Accordingly, step 832 essentially checks for whether sustained motion is happening nearby and whether local motion has recently occurred (e.g., with in the last 5 seconds). If so, then relay R2 is switched on to provide a high illumination level at step 818. T2 is reset to 30 seconds such that the high level of illumination will be provided for at least 30 seconds. Further, transceiver 306 is caused to rebroadcast a sustained motion message to the zone.

If a sustained motion message is not received at step 832 (or T5 is zero when the sustained motion message is received), then a check is conducted for whether zone motion has been received (step 834). A zone motion message is a message from another lighting fixture's transceiver in the zone indicating that motion (but not sustained motion) was detected by the transmitting fixture's motion sensor. If the loop has progressed to step 834 and no zone motion has been received, then step 820 is reached without further state changes and the loop continues as described above. If a zone motion message has been received during a cycle of the loop at step 834, then relay R1 is switched on to provide a dim illumination level (step 836). At step 836, T1 is also reset to equal 90 seconds and the received zone motion message is retransmitted to the rest of the zone. Step 820 is then reached and the loop continues.

Because of the activity of steps 834, 836, when transient motion is detected in an aisle or other zone, the entire zone illuminates at a dim level for at least 90 seconds. Such activity ensures a worker making a quick trip to the zone will at least have a dim level of light. If any sustained motion is detected (e.g., at step 812), then a bubble of light (i.e., high illumination) is formed around the worker's sustained motion. In other words, the fixture that detects the local motion is switched to high illumination at step 818. Further, the fixture that detects the local motion transmits (i.e., blasts) a sustained local motion message at step 818. Nearby fixtures that have detected motion within the last 5 seconds and receive the sustained local motion message are also switched to high illumination. In an exemplary embodiment, some amount of motion sensor overlap may be provided or desired so that two or more lighting fixtures typically switch to high illumination when sustained motion is occurring.

Advantageously, the process 800 shown in FIG. 8 can save energy relative to conventional lighting system that are timer-based. Further, FIG. 8 can provide for varying levels of illumination depending on the activity in particular spaces—providing safety to workers that are locally working on a project for longer than 6 seconds, but saving energy by refraining from turning all of the lights in the zone to high illumination. Trips that do not require concentrated movement under any particular light for longer than 6 seconds do not result in any of the lights in the zone switching to high illumination, but the zone is illuminated at a relatively dim level to provide some light for the transient work/movement. All lights in a zone turn off or reduce to the lowest level of illumination, thereby saving energy, when no motion has been detected within the zone for 90 seconds.

Figure 9:
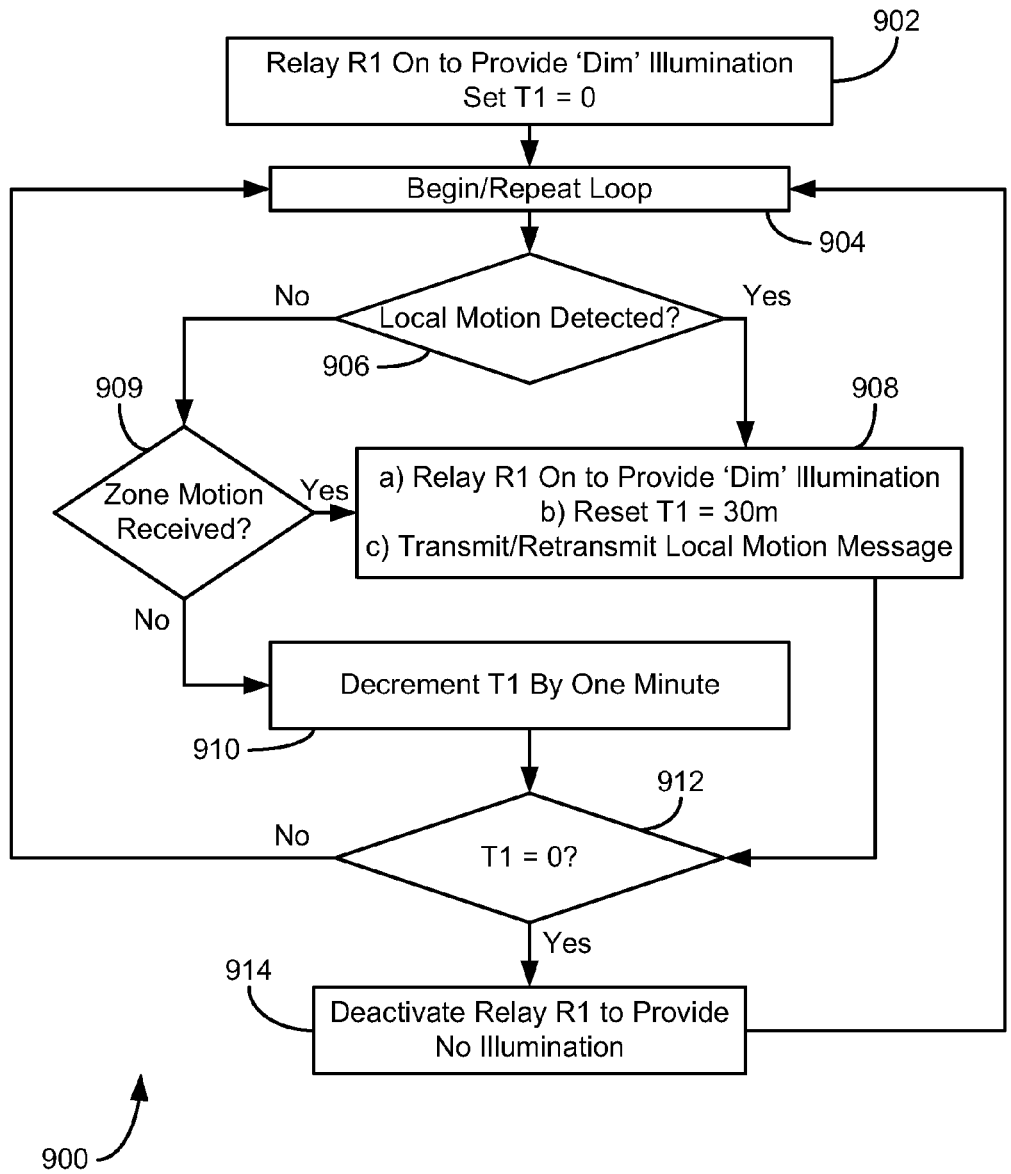
FIG. 9 is a flow chart of a process for providing an energy saving 'general' mode of operation using a lighting fixture controller and a system of similarly configured lighting fixtures in a zone, according to an exemplary embodiment.

As illustrated and explained above with reference to FIG. 7, some of the lighting fixtures in a zone (i.e., the controllers for lighting fixtures in zone) can be set to an 'general' mode of operation. FIG. 9 illustrates a process 900 for providing an energy saving 'general' mode of operation, according to an exemplary embodiment. As is true for the other processes illustrated in the present application, variations (e.g., timing, step ordering, the logic of particular checks and steps, etc.) of process 900 may be made and still fall within the scope of the present disclosure. Referring generally to FIG. 9, process 900 is configured such that the lighting fixtures are set at a 'dim' level of illumination depending when motion is detected within their assigned zone. If thirty minutes elapses without further motion in the zone, the fixtures turn off (or reduce illumination even further).

As shown in step 902 of process 900, lighting fixture controllers set in an 'general' mode of operation cause relay R1 to be 'on' by default, providing a 'dim' (e.g., not the maximum) level of illumination. Timer T1 (e.g., the time period for which a dim level of illumination should be provided) is initially zero. At step 904 the primary loop of process 900 begins or restarts. Periodically (e.g., after a delay cycle, after a logic cycle, etc.) process 900 will check for whether local motion has been detected (step 906). When local motion has been detected, processing electronics of the lighting fixture's controller cause relay R1 to be on such that 'dim' illumination is provided from the accompanying lighting fixture (step 908). A local motion message is also broadcasted to other lighting fixtures (i.e., lighting fixture controllers having wireless transceivers) in the zone. When local motion is detected, timer T1 is reset to equal thirty minutes. When local motion is not detected at step 906, process 900 includes checking for whether a zone motion message was received from another fixture in the zone (step 909). If a zone motion message was received, then relay R1 is energized (or remains energized), T1 is reset to thirty minutes, and the local motion message is rebroadcast (step 908) for reception by yet other fixtures within the zone (which might be out of transmission range relative to the devices that originally transmitted the motion message). If neither local motion is detected at step 906 nor a zone motion message is received at step 909, timer T1 is decremented by one (step 910). If T1 is found to equal zero at step 912, then relay R1 is deactivated to provide no illumination (step 914). While T1 is not zero (i.e., it has been less than thirty minutes since motion in the zone), decision step 912 causes process 900 to loop back to step 904.

Figure 10:
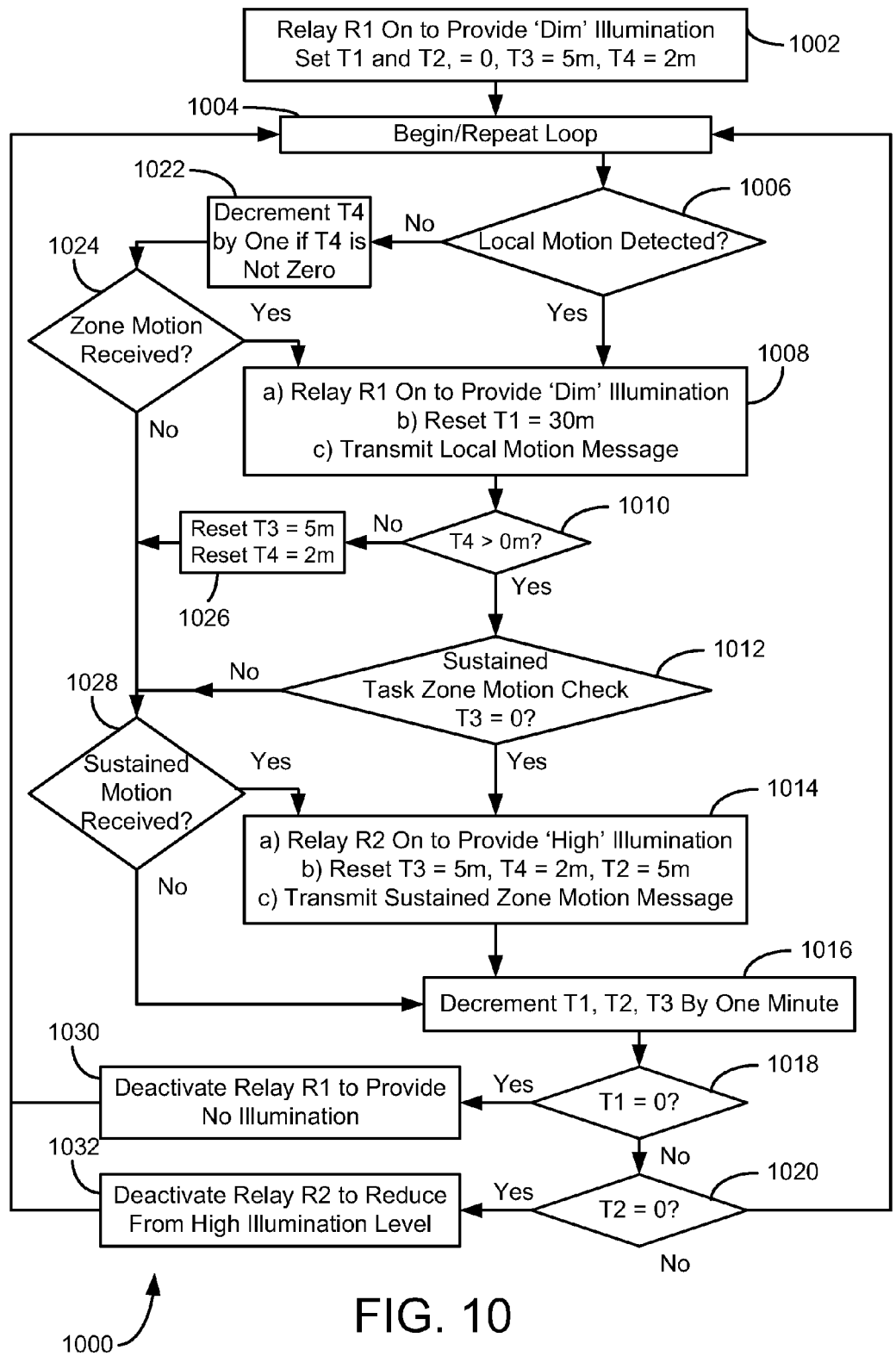
FIG. 10 is a flow chart of a process for providing an energy saving 'task' mode of operation using a lighting fixture controller and a system of similarly configured lighting fixtures in a zone, according to an exemplary embodiment.

As illustrated and explained above with respect to FIG. 7, some of the lighting fixtures in a zone can be set to a 'task' mode of operation. FIG. 10 illustrates a process 1000 for providing an energy saving 'task' mode of operation, according to an exemplary embodiment. As is true for the other processes illustrated in the present application, variations (e.g., timing, step ordering, the logic of particular steps and checks, etc.) of process 1000 may be made and still fall within the scope of the present disclosure. Referring generally to FIG. 10, process 1000 is configured such that the lighting fixtures are set at a relatively dim level of illumination in response to motion that is sustained for less than five minutes. The lighting fixtures are set at a higher level of illumination (e.g., 'high', 'occupied', etc.) when there has been five minutes of sustained motion. After five minutes of no motion, the lighting fixtures return to a dim level of illumination. After thirty minutes of no motion, the lighting fixtures turn off.

As shown in step 1002 of process 1000, lighting fixture controllers set in a 'task' mode of operation cause relay R1 to be 'on' initially, providing a 'dim' (e.g., not the maximum) level of illumination. Timers T1 and T2 (e.g., the time periods for dim lighting and high lighting, respectively) are initially zero. Timers T3 and T4 (used to detect sustained motion) are initially set to five minutes, and two minutes, respectively. The loop begins or repeats at step 1004. When local motion is detected at step 1006, relay R1 is energized (or remains energized), T1 is reset to equal thirty minutes, and a local motion message is transmitted to the other fixtures in the zone (step 1008). If there is no local motion, T4 may be decremented by one (if T4 is not zero) at step 1022. When local motion is not detected at step 1006, process 1000 includes checking for whether a zone motion message was received from another fixture in the zone (step 1024). If so, then step 1008 is called.

T4 is used as a dwell timer such that up to a two minute break in motion can elapse before the T3 countdown for sustained motion is reset. Therefore, at step 1010, if T4 is not greater than zero, the timers for T3 and T4 are reset to 5 minutes and 2 minutes, respectively (step 1026). If T4 is still greater than zero, process 1000 includes checking for sustained task zone motion and if T3 is zero (step 1012). If either is true, then sustained motion was detected (either via a message from another lighting fixture or via T3 reaching zero, indicating 5 minutes of sustained motion) and relay R2 is energized (or remains energized) (step 1014). Further, T3 is reset to 5 minutes, T4 is reset to 2 minutes (resetting the timers used to detect sustained motion), and a sustained zone motion message is transmitted to the other fixtures in the zone. Further, if a zone motion message was not received at step 1024, process 1000 includes checking for a sustained motion message (step 1028). If so, then step 1014 is called.

After process 1000 checks for sustained motion, process 1000 includes decrementing T1, T2, and T3 by one minute (step 1016). Process 1000 then checks if either T1 or T2 is zero (steps 1018, 1020) to determine if the lighting state should change. If T1 is zero, then relay R1 is deactivated to provide no illumination (step 1030), and if T2 is zero, then relay R2 is deactivated to reduce the lighting from a high illumination level to a dim illumination level (step 1032).

Figure 11:
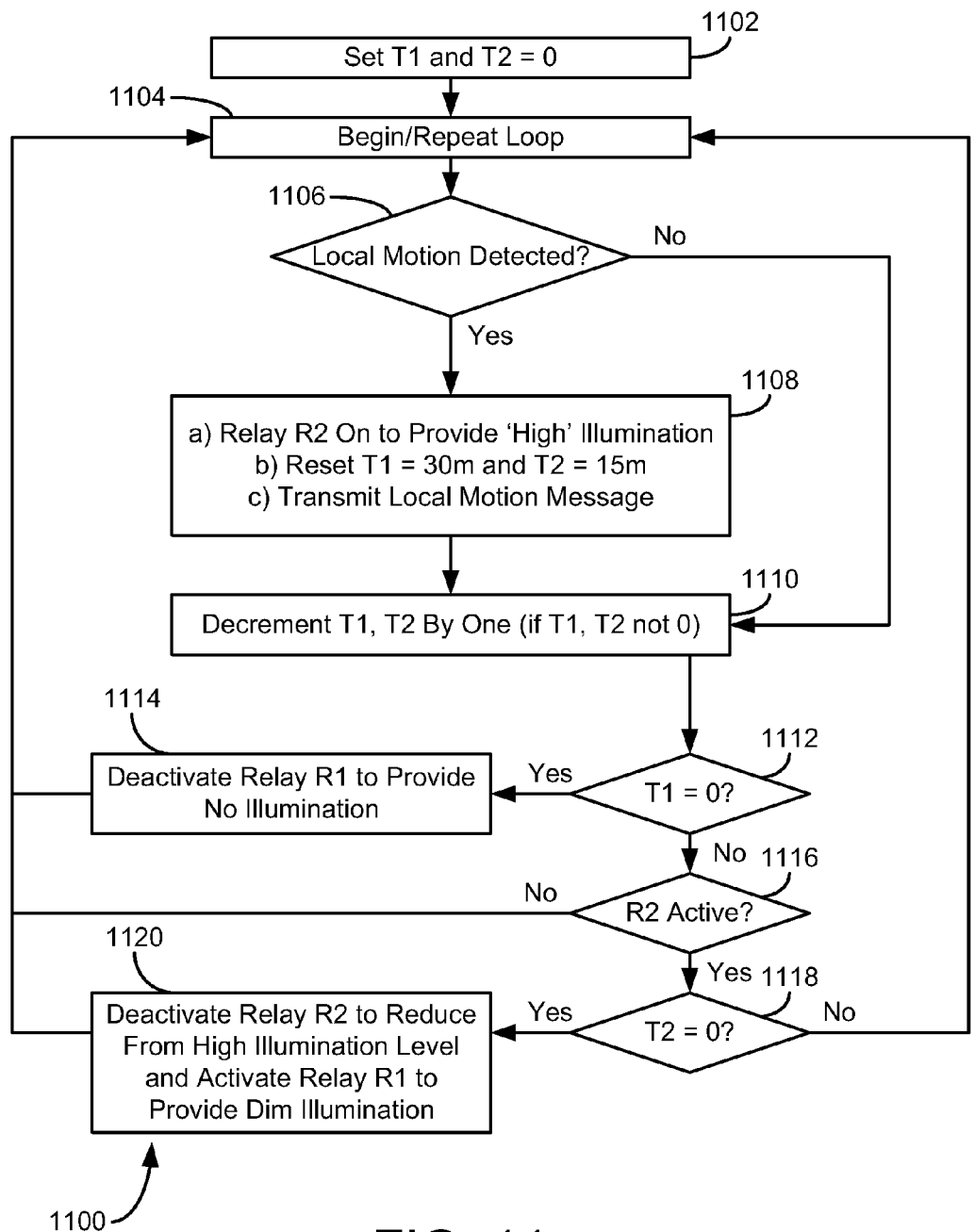
FIG. 11 is a flow chart of a process for providing a 'step dimming' mode of operation using a lighting fixture controller and a system of similarly configured lighting fixtures in a zone, according to an exemplary embodiment.

Referring now to FIG. 11, a flow chart of a process 1100 for providing a 'step dimming' mode of operation, according to an exemplary embodiment. Process 1100 is configured to, upon detection of local motion, provide lighting for an area. Upon detection of motion, a high illumination may be provided by the lighting fixture. After a period of time of no detected motion, the lighting is reduced from high illumination to dim illumination. After another period of time of no detected motion, the lighting fixture then turns off. As is true for the other processes illustrated in the present application, variations (e.g., timing, step ordering, the logic of particular steps and checks, etc.) of process 1100 may be made and still fall within the scope of the present disclosure. In the steps of FIG. 11, deactivating a relay may not turn the lamp entirely off, but may merely step down or step dim a ballast/lamp combination.

As shown in step 1102, timers T1 and T2 (representing the time periods for dim illumination and high illumination, respectively) are initially set to zero. Process 1100 begins or repeats at step 1104. Upon detection of local motion at step 1106), relay R2 is energized (or remains energized), T1 is reset to 30 minutes, T2 is reset to 15 minutes, and a local motion message is transmitted (step 1108).

Process 1100 further includes decrementing T1 and T2 by one if T1 and T2 are not zero (step 1110). Process 1100 further includes checking if T1 is now zero (step 1112). If so, then T1 has run out and process 1100 includes deactivating relay R1 to provide no illumination (or step-dim the illumination) (step 1114).

Process 1100 further includes, if R2 is active (step 1116), checking if T2 is now zero (step 1118). If so, then T2 has run out and process 1100 includes deactivating relay R2 to reduce illumination (step 1120). Further, step 1120 includes activating relay R1 since dim lighting should now be provided instead of high lighting.

Figure 12:
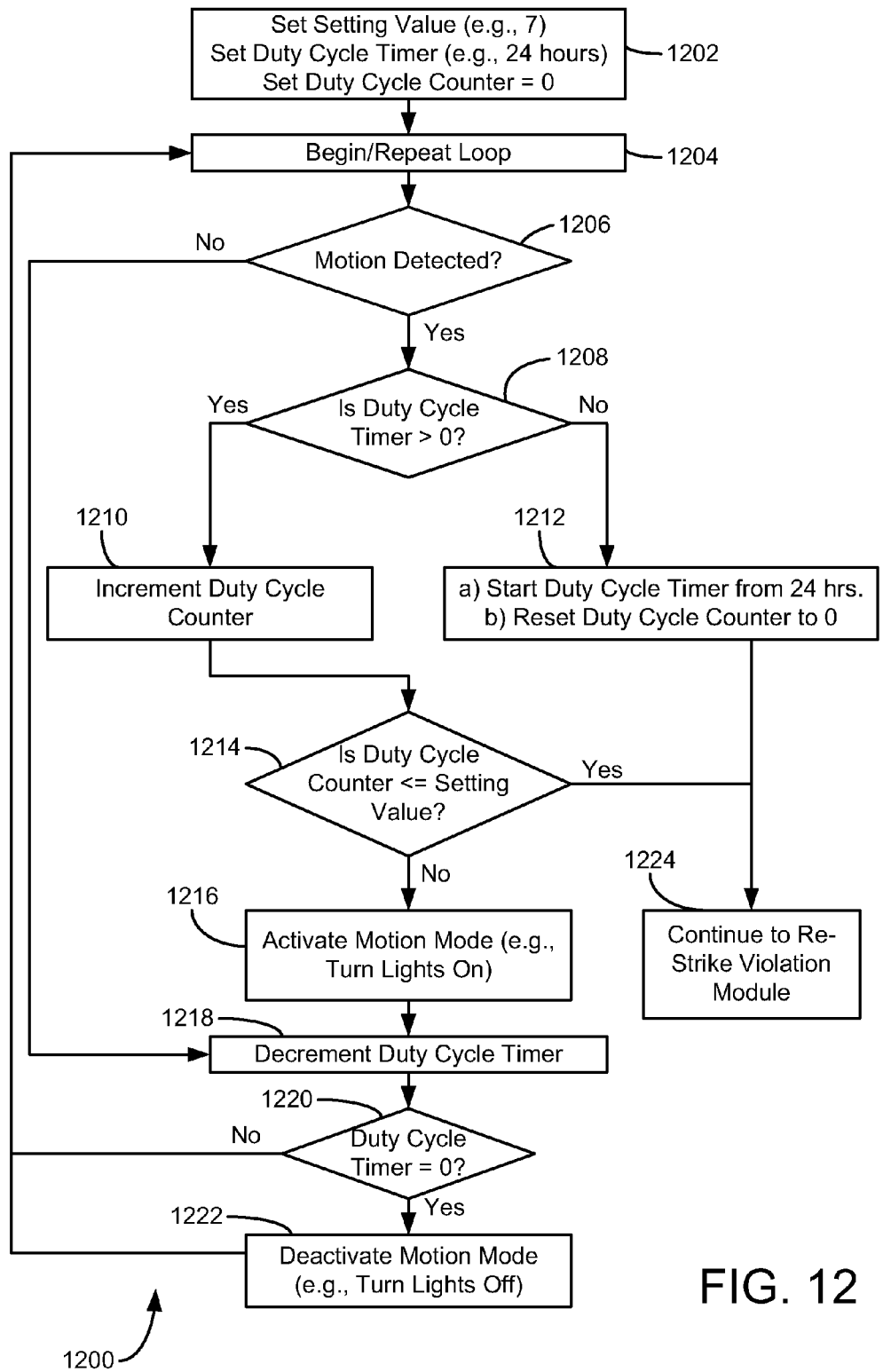
FIG. 12 is a flow chart of a process for tracking and controlling lighting fixture duty cycle where the lighting fixture is configured to transition (e.g., turn on and off, change brightness levels) during the day according to motion-based control, according to an exemplary embodiment.

Referring now to FIG. 12, a flow chart of a process 1200 for providing a duty cycle mode of operation is shown, according to an exemplary embodiment. Process 1200 can run in parallel with any of the motion-based control modes described above (e.g., in FIGS. 8-11). Duty cycle mode is intended to protect a lighting fixture ballast/lamps from cycling too frequently due to the motion based control.

Process 1200 includes determining a setting value, the duty cycle timer, and duty cycle counter (step 1202). The setting value relates to a maximum number of lamp-on transitions (e.g., a transition from local motion to sustained motion, a transition from 'standby' or no motion to local motion) that is allowed for the system before a lighting fixture remain 'on' for a longer period of time (preventing premature aging). The setting value may be set automatically or by a user. In process 1200, the setting value is set to seven. The duty cycle timer is a set period of time (e.g., 24 hours) for which strikes should be counted for. Accordingly, the duty cycle counter is be used to count the number of motion-based transitions during one 24 hour period. Process 1200 includes beginning or repeating the loop (step 1204) by determining if lights are detected (step 1206).

The duty cycle timer is checked in step 1208. If the duty cycle timer is not greater than zero, the duty cycle timer may be started (e.g., starts counting down from 24 hours), the duty cycle counter is reset to zero (step 1212) and the re-strike process (shown in FIG. 13) is called (step 1224). If the duty cycle timer is greater than zero, the duty cycle counter is incremented (step 1210). If the duty cycle counter is less than or equal to the setting value determined in step 1202 (step 1214), then the re-strike process is called (step 1224) in order to determine if re-strike protection is in order.

If the duty cycle counter is greater than the setting value, then process 1200 includes activating the motion mode (e.g., turning the lights on) of the lighting fixture (step 1216). The motion mode of the lighting fixture generally represents a desired lighting pattern as described in the disclosure (e.g., the 'general' mode of operation of the lights, the 'task' mode of operation of the lights, the 'step dimming' mode of operation of the lights, etc.).

Process 1200 further includes decrementing the DC timer (step 1218) and determining if the DC timer has reached zero (step 1220). If so, the motion mode should be deactivated (step 1222). When the duty cycle timer reaches zero, then the 24 hour period (or another period as determined in process 1200) has expired and the functionality of the lighting fixture should return to a normal operation (e.g., transitioning according to the straight on-off control of one of the motion-based control modes as shown in FIGS. 8-11 or otherwise).

Figure 13:
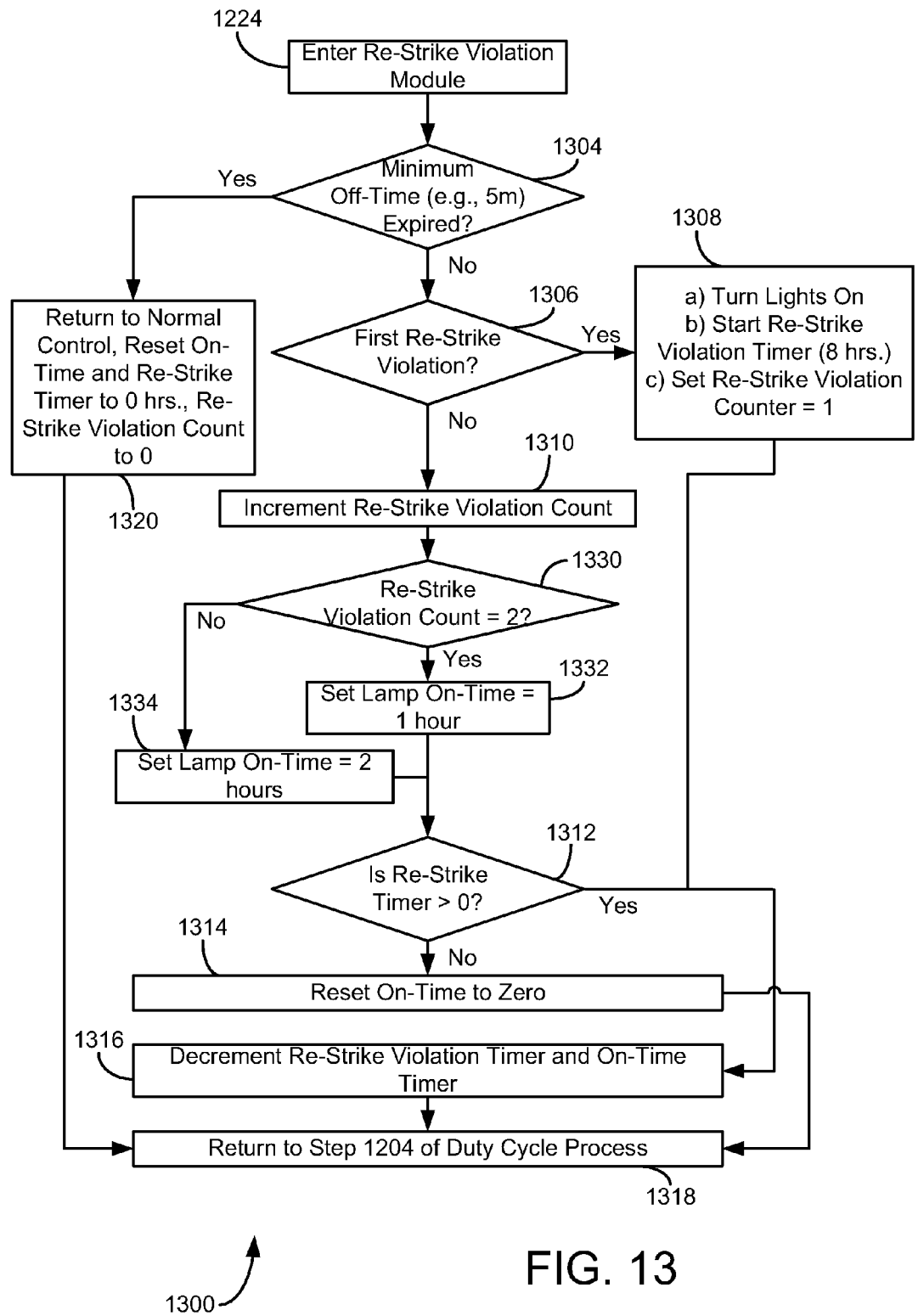
FIG. 13 is a flow chart of a process for tracking and controlling lighting fixture re-strike violation rules where the lighting fixture is configured to transition (e.g., turn on and off, change brightness levels) during the day according to motion-based control, according to an exemplary embodiment.

Referring to FIG. 13, a flow chart of a process 1300 for changing light fixture states based on re-strike violations is shown, according to an exemplary embodiment. Process 1300 is called by process 1200 and more specifically step 1224 of FIG. 12.

Process 1300 includes determining if a minimum off-time has expired (step 1304). The minimum off-time relates to motion detection within a certain period of time (e.g., 5 minutes) after lights have been cycled off. If the minimum off-time has elapsed, the lighting fixture may be returned to normal control (e.g., the re-strike period is over and regular operation of the lighting fixture resumes), the on-time and re-strike timers are reset to zero for the next time the re-strike process is called, and the re-strike violation counter is reset to zero (step 1320). If the minimum off-time has yet to expire, the motion detected in process 1200 is determined to be a re-strike violation by process 1300.

Process 1300 includes determining if the re-strike violation is the first one (step 1306). If so, the lights are activated (step 1308). Further, in step 1308, the re-strike violation timer is started and the re-strike violation counter is set to one. The re-strike violation timer may be a set period of time (e.g., 8 hours) for which re-strike violations are counted by process 1300. The re-strike violation counter counts the number of violations.

If the re-strike violation was not the first such violation, the re-strike violation count is incremented (step 1310). Further, if the re-strike violation count is two (step 1330), the lamp on-time may be set to one hour (step 1332), controllably holding the lamp on for at least one hour regardless of any motion-based inputs. If there are three or more re-strike violations, the lamp on-time may be set to two hours (step 1334), controllably holding the lamp on for at least two hours regardless of any motion-based inputs.

Process 1300 further includes checking if the re-strike timer is greater than zero (step 1312). If so, the re-strike violation and on-time timers are decremented (step 1316). Otherwise, the re-strike violation timer has expired and the on-time is re-set to a zero (step 1314) (e.g., the on-time for the lighting fixture relating to a re-strike violation is zero). Process 1300 further includes returning to step 1204 of the duty cycle process of FIG. 12 (step 1318).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A lighting fixture for energy efficient aisle lighting in a building, comprising:
processing electronics configured to cause the lighting fixture to provide increasing levels of illumination in response to state changes associated with sensed motion in the building, wherein the state changes comprise:
(a) a transition from a no motion state to a local motion state; and
(b) a transition from the local motion state to a sustained motion state.

2. The lighting fixture of claim 1, wherein the lighting fixture is configured to conduct the state transitions without reliance on a remote supervisory controller and without regular user inputs.

3. The lighting fixture of claim 1, further comprising:
a motion sensor in communication with the processing electronics;
wherein the processing electronics transitions from the no motion state to the local motion state in response to estimating motion to be present in an area local to the lighting fixture based on information from the motion sensor.

4. The lighting fixture of claim 3, wherein the processing electronics cause the lighting fixture to provide less than half of the lighting fixture's capable illumination output while in the local motion state.

5. The lighting fixture of claim 3, wherein the processing electronics cause the lighting fixture to provide more than half of the lighting fixture's capable illumination output while in the sustained motion state.

6. The lighting fixture of claim 1, wherein the state changes further comprise:
(c) a transition from the sustained motion state to the no motion state; and
(d) a transition from the local motion state to the no motion state.

7. The lighting fixture of claim 1, wherein the state changes further comprise:
(c) a transition from the sustained motion state to the local motion state; and
(d) a transition from the local motion state to the no motion state.

8. The lighting fixture of claim 1, further comprising:
an RF receiver;
wherein the state changes further comprise: (c) a transition from the local motion state to a communicated sustained motion state;
wherein the processing electronics are configured to transition from the local motion state to the communicated sustained motion state in response to a reception at the RF receiver indicating sustained motion in a zone associated with the lighting fixture;
wherein the processing electronics cause the lighting fixture to provide more than half of the lighting fixture's capable illumination output while in the communicated sustained motion state.

9. A system for energy efficient lighting of an aisle in a building, comprising:
a plurality of lighting fixtures, wherein each of the plurality of lighting fixtures comprises
a motion sensor,
a transceiver, and
processing electronics, and
wherein the processing electronics for each lighting fixture are configured to cause the respective lighting fixture to provide increasing levels of illumination in response to state changed associated with motion sensed by the motion sensor, wherein the state changes comprise (a) a transition from a no motion state to a local motion state; and (b) a transition from the local motion state to a sustained motion state.

10. The system of claim 9, wherein the processing electronics are configured to initiate the transition from the local motion state to the sustained motion state when motion is detected with for longer than a predetermined period of time.

11. The system of claim 10, wherein the processing electronics are configured to cause the transceiver to transmit a message indicating the transition to the sustained motion state.

12. The system of claim 11, wherein the processing electronics are configured to cause the transition to the sustained motion state in response to receiving a message at the transceiver indicating a transition to the sustained motion state by a nearby lighting fixture.

13. The system of claim 12, wherein each lighting fixture is configured to cause the lighting fixture to provide less than half of the lighting fixture's capable illumination output while in the local motion state.

14. The system of claim 13, wherein each lighting fixture is configured to cause the lighting fixture to provide more than half of the lighting fixture's capable illumination output while in the sustained motion state.

15. The system of claim 14, wherein the state changes further comprise:
(c) a transition from the sustained motion state to the no motion state; and
(d) a transition from the local motion state to the no motion state.

16. A method for providing energy efficient lighting of an aisle in a building, comprising:
using a motion sensor and processing electronics coupled to a first lighting fixture to distinguishing between transient motion and sustained motion, wherein distinguishing between the transient motion and the sustained motion comprises determining that motion has been detected in a space for at least a predetermined period of time;
at the first lighting fixture, transitioning from a transient motion state to a sustained motion state in response to a determination of sustained motion; and
at the first lighting fixture, transitioning from a no motion state to a local motion state in response to a determination of local motion.

17. The method of claim 16, further comprising:
transmitting a notification to a nearby lighting fixture that indicates sustained motion has been detected;
responding to receiving the notification, at the nearby lighting fixture, by determining whether to transition into a different lighting state.

18. The method of claim 17, wherein the different lighting state is a sustained motion state and wherein the nearby lighting fixture transitions into the sustained motion state when processing electronics of the nearby lighting fixture determines that the received notification was received within a predetermined period of time from a detection of local motion wherein the first lighting fixture and the nearby lighting fixture are configured to transition from the sustained motion state to a local motion state after a second predetermined period of time.

19. The method of claim 16, further comprising:

at the first lighting fixture, counting a ballast re-strike violation when a motion-based transition causes a transition into a sustained motion state within a period of time since the fixture transitioned out of the sustained motion state;

controlling the first lighting fixture to remain in the sustained motion state for a longer period of time than motion-based control would otherwise provide in response to the count of re-strike violations exceeding a pre-set amount.

20. The method of claim 16, further comprising:

tracking the number of times the first lighting fixture transitions from the local motion state to the sustained motion state;

controlling the first lighting fixture to remain in the sustained motion state for a longer period of time than the motion-based control would otherwise provide in response to the number of times the first lighting fixture transitioned from the local motion state to the sustained motion state.

\* \* \* \* \*